(12) United States Patent
Nishihara et al.

(10) Patent No.: US 7,729,588 B2
(45) Date of Patent: Jun. 1, 2010

(54) OPTICAL FIBER, MANUFACTURING METHOD OF THE SAME, AND OPTICAL AMPLIFIER

(75) Inventors: Masato Nishihara, Kawasaki (JP); Etsuko Hayashi, Kawasaki (JP); Shinya Inagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/847,663

(22) Filed: Aug. 30, 2007

(65) Prior Publication Data
US 2008/0013904 A1    Jan. 17, 2008

Related U.S. Application Data

(63) Continuation of application No. PCT/JP2005/020208, filed on Nov. 2, 2005.

(30) Foreign Application Priority Data
Mar. 30, 2005    (JP) ............................ 2005-098760

(51) Int. Cl.
*G02B 6/02* (2006.01)
*G02B 6/36* (2006.01)
(52) U.S. Cl. .................. 385/142; 385/124; 385/126; 385/127; 359/341.1; 359/341.2; 359/341.3
(58) Field of Classification Search ............... 385/123, 385/124, 126, 127, 142; 359/341.1, 341.2, 359/341.3; 65/390
See application file for complete search history.

(56) References Cited

U.S. PATENT DOCUMENTS

| 5,467,218 | A | * | 11/1995 | Takeda et al. ............. 359/341.3 |
| 5,500,764 | A | * | 3/1996 | Armitage et al. ........ 359/341.33 |
| 5,570,448 | A | * | 10/1996 | Imoto et al. ................. 385/126 |
| 5,778,129 | A | * | 7/1998 | Shukunami et al. ......... 385/127 |
| 5,861,973 | A | * | 1/1999 | Inagaki et al. .......... 359/341.41 |
| 5,970,198 | A | | 10/1999 | Inagaki et al. |

(Continued)

FOREIGN PATENT DOCUMENTS

JP    3-238883    10/1991

(Continued)

OTHER PUBLICATIONS

English translation of second page of International Search Report for corresponding International Application No. PCT/JP2005/020208.

(Continued)

*Primary Examiner*—Daniel Petkovsek

(57) ABSTRACT

An optical fiber includes: a first core portion doped with rare earth ions; a second core portion having a lower refractive index than that of the first core portion, provided along an outer circumference of the first core portion, and doped with the rare earth ions; and a clad portion having a lower refractive index than that of the second core portion and provided along an outer circumference of the second core portion, and is configured such that a concentration of the rare earth ions added to the second core portion is higher than that to the first core portion. With this configuration, it is possible to suppress an amount of FWM crosstalk in an optical amplification by decreasing the length of a fiber while alleviating efficiency deterioration due to concentration quenching.

4 Claims, 25 Drawing Sheets

U.S. PATENT DOCUMENTS

| | | | | |
|---|---|---|---|---|
| 6,043,930 | A | * | 3/2000 | Inagaki ............... 359/341.4 |
| 6,236,496 | B1 | * | 5/2001 | Yamada et al. ......... 359/341.33 |
| 6,538,806 | B2 | * | 3/2003 | Endo et al. ............ 359/341.5 |
| 6,687,439 | B1 | | 2/2004 | Endo et al. |
| 7,440,165 | B2 | * | 10/2008 | Seo et al. .............. 359/334 |
| 2003/0147620 | A1 | * | 8/2003 | Anderson et al. ........ 385/142 |

FOREIGN PATENT DOCUMENTS

| | | |
|---|---|---|
| JP | 4-21532 | 1/1992 |
| JP | 5-121818 | 5/1993 |
| JP | 9-1299948 | 5/1997 |
| JP | 9-269432 | 10/1997 |
| JP | 11-121839 | 4/1999 |
| JP | 2000-252558 | 9/2000 |
| JP | 2004-4772 | 1/2004 |

OTHER PUBLICATIONS

Y. Moriai, et al., "Development of the Low Non-Linear La Co-Doped EDF", Technical Report of the Institute of Electronics, Information and Communication Engineers, vol. 102, No. 357, pp. 27-30, Sep. 27, 2002, Abst.

N. Shukunami, et al., "Wavelength Multiplexed Gain Characteristic of Ring Doped EDF", Proceedings fo the IEICE General Conference, Electronics (1), pp. 328, issued Nov. 3, 1996.

Notice of Reasons for Rejection dated Nov. 16, 2009 issued in U.S. Appl. No. 2007-521072.

* cited by examiner

FIG. 7

| PARAMETER | PROPOSED EDF | CONVENTIONAL EDF |
|---|---|---|
| CORE DIAMETER a ($\mu$m) | 2.94 | 2.94 |
| CORE DIAMETER b ($\mu$m) | 4.9 | 4.9 |
| RELATIVE REFRACTIVE INDEX DIFFERENCE $\Delta 1$(%) | 1.6 | 1.6 |
| RELATIVE REFRACTIVE INDEX DIFFERENCE $\Delta 2$(%) | 0.1 | 0.1 |
| Er ION CONCENTRATION $N_{t1}$(ppm wt) | 1500 | 1500 |
| Er ION CONCENTRATION $N_{t2}$(ppm wt) | 4500 | 1500 |
| DISPERSION AT 1580 nm(ps/nm$^2$/km) | -25.2 | -25.2 |
| EFFECTIVE SECTIONAL AREA ($\mu$m$^2$) | 16.9 | 16.9 |
| NONLINEAR REFRACTIVE INDEX ($\times 10^{-20}$m$^2$/W) | 2.8 | 2.8 |

| PARAMETER (UNIT) | VALUE |
|---|---|
| CORE DIAMETER a (μm) | 2.94 |
| CORE DIAMETER b (μm) | 4.9 |
| RELATIVE REFRACTIVE INDEX DIFFERENCE Δ1(%) | 1.6 |
| RELATIVE REFRACTIVE INDEX DIFFERENCE Δ2(%) | 0.1 |
| Er ION CONCENTRATION: Nt1(ppm wt) | 1500 |
| Er ION CONCENTRATION: Nt2(ppm wt) | 0~7500 |
| DISPERSION AT 1580 nm(ps/nm²/km) | −25.2 |
| EFFECTIVE SECTIONAL AREA (μm²) | 16.9 |
| NONLINEAR REFRACTIVE INDEX (×10⁻²⁰m²/W) | 2.8 |

| Er CONCENTRATION IN SECOND CORE PORTION | EDF LENGTH | REQUIRED EXCITATION POWER |
|---|---|---|
| 0 ppmwt | 63.2 m | 359.2 mW |
| 4500 ppmwt | 24.9 m | 340.4 mW |
| 7500 ppmwt | 17.8 m | 344.2 mW |

OPTICAL FIBER, MANUFACTURING METHOD OF THE SAME, AND OPTICAL AMPLIFIER

This application is a continuation application, filed under 35 USC 111(a), of International Application PCT/JP2005/020208, filed Nov. 2, 2005, which is herein incorporated by reference in its entirety.

BACKGROUND OF THE INVENTION

1) Field of the Invention

The present invention relates to an optical fiber, a manufacturing method of the same, and an optical amplifier, and in particular, to a technique suitable to be used in a Wavelength Division Multiplex transmission system in which a wavelength interval between signals is decreased in comparison with a conventional technique in order to obtain a larger transmission capacity.

2) Description of the Related Art

A Wavelength Division Multiplex (WDM) transmission system, in which signal light having different wavelengths is transmitted through a single optical fiber, has been put into practical use as means to realize a larger transmission capacity in an optical communications system. Examples of key devices of the WDM transmission system include an optical amplifier that compensates an optical loss at the fiber, and as an example of optical amplifiers that can handle signal light in a C band (1529-1563 nm), an Erbium Doped Fiber Amplifier (EDFA) in which Erbium Doped Fiber (EDF) is employed as an amplifying medium is used. Then, an L band EDFA that amplifies signal light in an L band (1570-1608 nm) that is on a longer wavelength side of the C band is developed, and the capacity of the optical transmission system is further increased by using this L band EDFA in combination with the conventional C band EDFA.

Conventionally, a typical EDF that is used as an amplifying medium includes, as shown in FIG. 20, a core portion 22 and a clad portion 23. A refractive index of the core portion 22 is greater than a refractive index of the clad portion 23, and therefore, most of the signal light and pump light propagate through a fiber by repeating a total reflection in the core portion 22. Further, Erbium ions ($Er^{3+}$) that contribute to amplification of the signal light are added to an entirety of or a portion of the core portion 22, and energy that the Erbium ions have absorbed from the pump light is transferred to the signal light, thereby amplifying the signal light.

Here, the above L band EDFA has a characteristic that a gain per unit length of the EDF as an amplifying medium is small. Therefore, in order to obtain a sufficient gain as an amplifier, it is necessary to increase a length of the EDF. On the other hand, there has been a problem that an increased length of the EDF can results in a greater influence of a crosstalk due to Four Wave Mixing (FWM), which is a non-linear effect occurring in the EDF, leading to deterioration of transmission performance.

In order to address the above problem, there have already been proposed several methods to improve transmission performance of an optical amplifier. Techniques disclosed in Patent Document 1 and Patent Document 2 are among such methods.

According to the technique disclosed in Patent Document 1, it is possible to suppress the nonlinear effect such as the FWM by providing a first core portion, a second core portion provided on a side of an outer circumference from the first core portion and having a refractive index smaller than that of the first core portion, and a clad portion provided on a side of an outer circumference from the second core portion and having a refractive index smaller than that of the second core portion, by doping the first core portion and the second core portion with at least one type of rare earth element, respectively, and by using a DSC (Dual Shape Cores fiber) type refractive index profile for a refractive index distribution.

Further, according to the technique disclosed in Patent Document 2, by using a fiber for optical amplification that is a silica based fiber including a first core portion, a second core portion surrounding the first core portion and having a refractive index lower than that of the first core portion wherein a difference between the refractive indexes is from 0.2 to 1.0%, and a clad portion surrounding the second core portion and having a refractive index lower than that of the second core portion wherein a difference between the refractive indexes is from 0.3 to 2.0%, in which the first core portion is a silica based glass which is a doped rare earth element, pump light can propagate for a long distance through the second core portion which is low loss because it is a silica based glass, and thus it is possible to increase gain efficiency of the amplifier.

Patent Document 1: Japanese Patent Laid-Open No. 2004-4772

Patent Document 2: Japanese Patent Laid-Open No. HEI 3-238883

SUMMARY OF THE INVENTION

Problem to be Solved by the Invention

According to the technique disclosed in Patent Document 1, in order to solve the problem of a typical EDF structure, flexibility in designing of EDF is increased by providing a first core portion 24, a second core portion 25, and a clad portion 26 as shown in FIG. 21. With this configuration, it is possible to increase a value of wavelength dispersion of an EDF 20 in comparison with the conventional fiber structure shown in FIG. 20, as well as to suppress the FWM. Further, according to the technique disclosed in the above Patent Document 2, it is possible to improve the gain efficiency of the amplifier by efficiently utilizing the pump light.

However, because an effect of the FWM increases as the wavelength interval between WDM signals is decreased, further suppression of the FWM is required in a transmission system with a decreased wavelength interval, for example, an interval of 25 GHz, between signals in comparison with the conventional example, in order to expand the capacity.

In order to solve this problem, it is important to obtain a shorter EDF length to shorten an interaction length of the FWM. On the other hand, in order to obtain a desired gain for an optical amplifier, it is necessary to maintain a product of the EDF concentration and length (Erbium ion concentration×EDF length). Therefore, it is required to decrease the EDF length while the Erbium ion concentration is increased. Here, given that the product of the concentration and length is constant, a result of calculation of an amount of FWM crosstalk when the EDF length varies is shown in FIG. 22. As shown in FIG. 22, it can be seen that the FWM is surely suppressed as the EDF length becomes shorter.

However, another problem has been known that when the concentration of the Erbium ions becomes too large, the gain efficiency of the EDFA deteriorates due to a phenomenon called concentration quenching (see FIG. 23). The efficiency deterioration due to the concentration quenching cannot be avoided even with the above methods. Decreasing the EDF length in order to suppress the FWM has a problem that there is a limit to maintaining the gain efficiency.

Now, the principle of the concentration quenching is described with reference to FIG. 24. FIG. 24 is an energy level diagram of the Erbium ions, and a filled circle in the diagram indicates the Erbium ions present in each energy level. As can be seen from FIG. 24, energy moves from the Erbium ions on a donor side to the Erbium ions on an acceptor side, and the energy level is decreased on the donor side and increased on the acceptor side. However, after that, on the acceptor side, the energy is released and returns to the original energy level. Such an energy exchange between the Erbium ions does not contribute to the amplification, and is called a nonradiation energy exchange.

This nonradiation energy exchange occurs more frequently as the Erbium ion concentration in the EDF increases, and the distance between the Erbium ions becomes smaller. Consequently, a ratio of the Erbium ions that contributes to the amplification becomes smaller, and the amplification efficiency of the EDF decreases. Based on the above principal, the concentration quenching occurs.

The present invention is made in view of the above problems. An object of the present invention is to suppress an amount of generation of FWM in an amplifying medium by decreasing a length of the amplifying medium, while alleviating deterioration in gain efficiency due to concentration quenching.

Means for Solving the Problem

In order to achieve the above object, an optical amplifier according to the present invention includes: an optical fiber including: a first core portion doped with rare earth ions; a second core portion having a lower refractive index than that of the first core portion and provided along an outer circumference of the first core portion, the second core portion being doped with the rare earth ions of a higher concentration than that of the first core portion; and a clad portion having a lower refractive index than that of the second core portion and provided along an outer circumference of the second core portion; a forward pump unit that inputs first forward pump light in 980-nm band and second forward pump light in 1480-nm band to an input end of the optical fiber; and a backward pump unit that inputs backward pump light in 1480-nm band to an output end of the optical fiber, wherein population inversion ratios in the first and second core portions of the optical fiber are controlled by controlling an intensity ratio between the first forward pump light and the second forward pump light. Further, the intensity ratio may be controlled so that the population inversion ratio in the second core portion is 0.6 or less.

Moreover, in order to achieve the above object, an optical fiber according to the present invention includes: a first core portion doped with rare earth ions; a second core portion having a lower refractive index than that of the first core portion and provided along an outer circumference of the first core portion, the second core portion being doped with the rare earth ions of a higher concentration than that of the first core portion; and a clad portion having a lower refractive index than that of the second core portion and provided along an outer circumference of the second core portion. Further, the first core portion may be provided at a region where the population inversion ratio tends to increase due to wavelength dependency of a beam profile when pump light in a plurality of wavelength bands propagate, and the second core portion may be provided at a region where the population inversion ratio tends to be lower than that in the first core portion due to the wavelength dependency of the beam profile of the pump light.

In addition, core diameters of the first core portion and the second core portion may be respectively set such that, when pump light in a first wavelength band having a beam profile with a high confinement effect to the first core portion and pump light in a second wavelength band having a beam profile with a lower confinement effect to the first core portion than that of the pump light in the first wavelength band propagate as the pump light, contribution of the pump light in the second wavelength band to a change in the population inversion ratio in the second core portion becomes dominant. Further, the core diameters of the first core portion and the second core portion may be set to be a combination such that the contribution of the pump light in the second wavelength band to the change in the population inversion ratio in the second core portion becomes maximum within a range in which the pump light in the first wavelength propagates band in a single mode.

Moreover, in the above described optical fiber, a concentration of the rare earth ions in the first core portion and a concentration of the rare earth ions in the second core portion may be determined based on relation of degrees of changes in gain efficiency due to the pump light to the changes in the respective concentrations. Further, the concentration of the rare earth ions in the second core portion in which the population inversion ratio tends to be lower may be set to a value in a range in which the gain efficiency due to the pump light to the change in the concentration turns from an increase to a decrease.

Furthermore, the concentration of the rare earth ions in the first core portion and the concentration of the rare earth ions in the second core portion may be configured to have increases in the concentration from a constant concentration, respectively, so that decrease in gain efficiency for the increase from the constant concentration is substantially even, and the rare earth ions to be added to the first core portion and the second core portion may include at least Erbium ions.

Further, one of the first core portion and the second core portion may be further doped with at least one rare earth element selected from a group consisting of ytterbium, yttrium, lanthanum, and gadolinium. In addition, the first wavelength band may be 980-nm band, and the second wavelength band may be 1480-nm band.

Further, in order to achieve the above object, an optical fiber according to the present invention includes: a core portion doped with rare earth ions; and a clad portion, wherein in the core portion, a concentration of the rare earth ions is set higher in a region where a population inversion ratio tends to decrease due to wavelength dependency of a beam profile when pump light of a plurality of wavelength bands propagate. Further, the concentration of the rare earth ions in the region in which the population inversion ratio tends to be lower may be set to a value in a range in which the gain efficiency due to the pump light to the change in the concentration turns from an increase to a decrease. In addition, the plurality of wavelength bands include at least a 980-nm band and a 1480-nm band.

Further, in order to achieve the above object, an optical amplifier according to the present invention includes: an amplifying medium configured by an optical fiber including: a first core portion doped with rare earth ions; a second core portion having a lower refractive index than that of the first core portion and provided along an outer circumference of the first core portion, the second core portion being doped with the rare earth ions of a higher concentration than that of the first core portion; and a clad portion having a lower refractive index than that of the second core portion and provided along an outer circumference of the second core portion; and a pump light source for providing the amplifying medium with light having a wavelength with a higher confinement effect to the first core portion and a wavelength with a lower confinement effect to the first core portion, as pump light, and a difference between the wavelengths may be 300 nm or more. Further, the pump light source may be configured to provide both of the light having the wavelengths as forward pump light. Further, the pump light source may be configured to provide the light having one of the wavelengths as forward pump light and the light having the other of the wavelengths as backward pump light. Further, the pump light source may be configured to provide, as the pump light, at least 980-nm band light and 1480-nm band light.

Further, in order to achieve the above object, a manufacturing method of an optical fiber according to the present invention includes the steps of: producing a first preform for a first core layer doped with rare earth ions using a rod shaped glass tube; producing a second preform by forming a second core layer doped with rare earth ions in an internal layer of a hollow glass tube to be a clad, the rare earth ions being of a higher concentration than a concentration of the rare earth ions added to the first preform; and solidifying by inserting the first preform into the second preform. Further, the first preform may be produced by forming a first glass porous body by depositing silicon dioxide onto the rod shaped glass tube, as well as by doping the first glass porous body with the rare earth ions, and the second preform may be produced by forming a second glass porous body by depositing silicon dioxide onto the internal layer of the hollow glass tube, as well as by doping the second glass porous body with the rare earth ions.

Further, a proportion of pores in the second glass porous body may be made larger than a proportion of pores in the first glass porous body. Further, when forming the second preform, a layer made of silicon dioxide may be formed in a layer inner than the second core layer after forming the second core layer.

Effect of the Invention (1) According to the present invention as described above, it is possible to design the fiber freely by providing the first core portion doped with the rare earth ions, the second core portion having the lower refractive index than that of the first core portion and provided along the outer circumference of the first core portion, the second core portion being doped with the rare earth ions, and the clad portion having the lower refractive index than that of the second core portion and provided along the outer circumference of the second core portion. Thus, maximum amplification efficiency can be obtained by changing parameters such as a beam diameter.

(2) In addition, by making a concentration of the rare earth ions added to the second core portion larger than that to the first core portion, a product of the concentration and the length can be constant even when the length of the fiber is made shorter. Therefore it is possible to suppress an occurrence of the FWM by reducing the length of the fiber as an interaction length of action of the FWM while maintaining an amplification gain, thereby improving an amplification performance of the fiber as a whole.

(3) Further, the concentration of the rare earth ions in the first core portion and the concentration of the rare earth ions in the second core portion can be determined based on the relation of the degrees of the changes in gain efficiency to the changes in the respective concentrations. In particular, the concentration of the rare earth ions in the first core portion and the concentration of the rare earth ions in the second core portion can be configured so that the reduction in gain efficiency for the increase from the constant concentration is substantially even. With this, it is possible to optimize the concentration of the rare earth ions added to the core portions, thereby suppressing deterioration in gain efficiency due to concentration quenching to minimum.

(4) In addition, by further doping one of the first core portion and the second core portion with at least one rare earth element selected from a group consisting of ytterbium, yttrium, lanthanum, and gadolinium, a distance between the Erbium ions are made longer to increase dispersibility of the Erbium ions. In other words, it is possible to further suppress the deterioration in the gain efficiency due to the concentration quenching.

(5) Further, in the optical amplifier of the present invention as described above, by using the light having the wavelength with the higher confinement effect to the first core portion and the wavelength with the lower confinement effect to the first core portion, as pump light, for the amplifying medium, a desired beam profile can be obtained by output control of the pump light, and a pump of the rare earth ions (population inversion ratio) can be easily controlled without changing a fiber structure. The above control can be easily performed by providing, for example, two kinds of light having wavelengths with the difference of 300 nm or more as the pump light.

(6) Further, because the pump light source provides both of the light having the wavelengths as forward pump light, the population inversion ratios in the first core portion and the second core portion can be controlled efficiently.

(7) In particular, when the rare earth ions added to the optical fiber of the present invention are the Erbium ions, the Erbium ions are pumped by setting the forward pump light to be the 980-nm band light and the 1480-nm band light, and irradiating signal light to the Erbium ions generates a stimulated emission, thereby enabling amplification of the signal light.

(8) As described above, by improving the amplification performance of the optical amplifier while suppressing the deterioration in the gain efficiency due to the concentration quenching, it is possible to provide an optical amplifier suitable as a key device required for expanding capacity of an optical communications system, and to suppress the power of the pump light required for amplifying the signal light compared to the conventional example, thereby contributing to reduction of cost for an optical amplifier.

(9) Moreover, it is possible to easily manufacture a fiber according to the present invention, by the manufacturing method of the above described optical fiber that includes the steps of producing a first preform for a first core layer doped with rare earth ions using a rod shaped glass tube; producing a second preform by forming a second core layer doped with rare earth ions in an internal layer of a hollow glass tube to be a clad, the rare earth ions being of a higher concentration than a concentration of the rare earth ions added to the first preform; and solidifying by inserting the first preform into the second preform.

(10) Further, the proportions of pores in the first glass porous body and in the second glass porous body can be controlled by producing the first preform by forming a first glass porous body by depositing silicon dioxide onto the shaped glass tube and then doping the first glass porous body with the rare earth ions, and by producing the second preform by forming a second glass porous body by depositing silicon dioxide onto the internal layer of the glass tube and then doping the second glass porous body with the rare earth ions.

Thus, the concentration of the rare earth ions added to the second glass porous body can be easily made larger than the concentration of the rare earth ions added to the first glass porous body.

(11) Moreover, when forming the second preform, a layer made of silicon dioxide is formed in a layer inner than the second core layer after forming the second core layer, thereby preventing diffusion of the rare earth ions between the first core portion and the second core portion.

BRIEF DESCRIPTION OF THE DRAWINGS

FIG. 7 is a table of parameter values of EDFs used for performance comparison between a conventional EDFA and the EDFA according to the present embodiment;

DESCRIPTION OF REFERENCE NUMERALS

Figure 1:
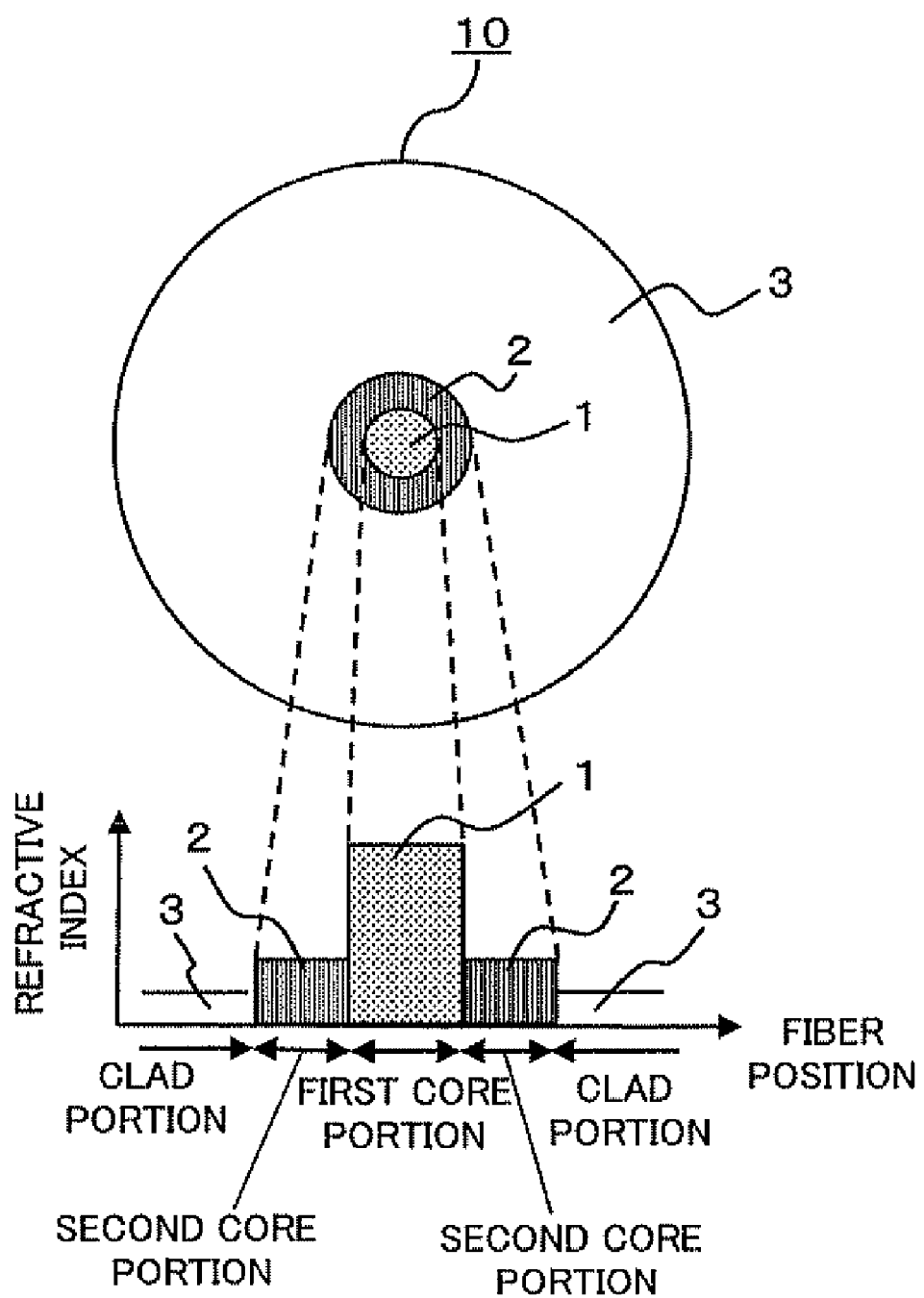
FIG. 1 is a diagram showing a cross sectional structure of a rare earth ion doped optical fiber and a distribution of refractive index according to one embodiment of the present invention.

1 First core portion
2 Second core portion
3, 23, 26 Clad portion
4 Input signal light
5a, 5b Optical isolator
6a, 6b 1480-nm pump light source
7 980-nm pump light source
8a, 8b 1480/1590-nm WDM coupler
9 980/1590-nm WDM coupler
10, 10a EDF
11 Output signal light
12 Glass tube
13 Glass porous body
14 Quartz glass tube
15 Glass porous body
16 First preform
17 Second preform
19 Silicon dioxide layer 20 Conventional EDF
22, 24 First core portion
25 Second core portion

DETAILED DESCRIPTION OF THE INVENTION (A) Explanation for EDF

FIG. 1 is a diagram showing a cross sectional structure of a rare earth ion doped optical fiber and a distribution of refractive index according to one embodiment of the present invention. As shown in FIG. 1, a rare earth ion doped optical fiber 10 according to the present embodiment includes, a first core portion 1, a second core portion 2 disposed on an outer circumference of the first core portion 1, and a clad portion 3 disposed on an outer circumference of the second core portion 2.

Further, the rare earth ion doped optical fiber 10 is configured so that the first core portion 1 has a greater refractive index than refractive indexes of the second core portion 2 and the clad portion 3, the refractive index of the second core portion 2 is smaller than that of the first core portion 1 but greater than that of the clad portion 3, and the refractive index of the clad portion 3 is smaller than the refractive indexes of the first core portion 1 and the second core portion 2. With such a configuration, a design flexibility of a fiber is allowed, and it is possible to set largest amplification efficiency by varying parameters such as beam diameter, for example.

Further, the first core portion 1 and the second core portion 2 are doped with Erbium ions ($Er^{3+}$), and serve to amplify signal light in an Erbium Doped Fiber Amplifier (EDFA) using the Erbium Doped Fiber (EDF) 10 as an amplifying medium. Moreover, a concentration of the Erbium ions are determined according to a later described method such that an Erbium ion concentration in the second core portion 2 is set to be greater than that of the first core portion 1. Consequently, an average Erbium ion concentration in the fiber can be made greater than that of a conventional fiber, and therefore, it is possible to maintain a product of the concentration and length even when the fiber is made short. Thus, the amplification efficiency can be maintained. In addition, setting the fiber length as an interaction length of FWM short can suppress occurrence of the FWM, thereby further improving an amplification performance of the fiber as a whole.

It should be noted that, in addition to the Erbium ions, both or one of the first core portion 1 and the second core portion 2 may be doped with at least one rare earth element from a group consisting of ytterbium (Yb), yttrium (Y), lanthanum (La), and gadolinium (Gd). With this configuration, a rare earth element other than the Erbium ions is inserted between the Erbium ions added to the respective core portions 1 and 2 to increase a distance between the Erbium ions, thereby increasing dispersibility of the Erbium ions in the cores. Specifically, this suppresses an energy exchange between the Erbium ions (nonradiation energy exchange), as well as deterioration in the gain efficiency due to the concentration quenching.

Further, it is preferable to use pump light for the EDF 10 having different beam profiles respectively for the first core portion 1 and the second core portion 2, and more preferably, to use two kind of pump light with a wavelength difference of 300 nm or more. For example, in a controlling method of a population inversion ratio as described later, it is suitable to use light of at least two kinds of a 980-nm band and a 1480-nm band. With this configuration, the Erbium ions can be effectively pumped. In particular, because the 980-nm band light has a high confinement effect into the first core portion 1, while 1480-nm band light has a low confinement effect into the first core portion 1, by controlling powers of the two kinds of pump light (power ratio), it is possible to obtain desired beam profiles for the respective pump light, and to facilitate the control of pumping of desired Erbium ions (population inversion ratio) without changing the fiber structure. However, the population inversion ratio can be readily controlled by using the pump light with the wavelength band having a higher confinement effect into the first core portion 1 and the pump light with the wavelength band having a confinement effect into the first core portion 1 that is lower than that of the former pump light with the wavelength band. It is possible to implement the present working example using such plurality of kinds of pump light.

Figure 2:
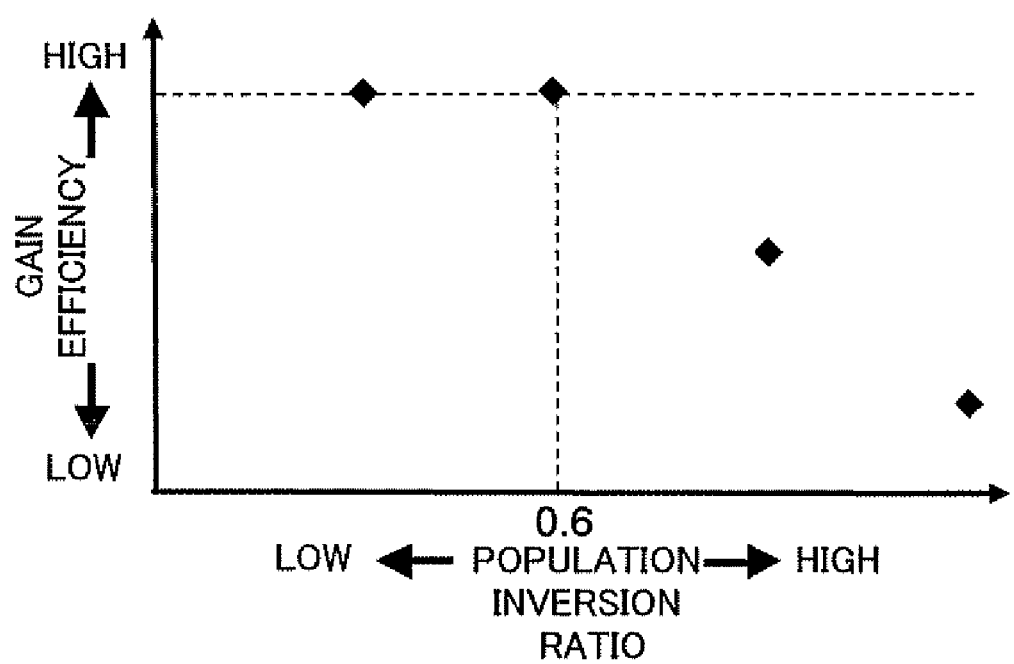
FIG. 2 is a diagram showing relation between a population inversion of Erbium ions and gain efficiency of an EDF according to the present embodiment.

Here, an attention should be paid to relation between the population inversion ratio of the EDF and gain efficiency deterioration due to the concentration quenching. The population inversion ratio indicates a proportion of a number of the Erbium ions with energy corresponding to an upper level in a two-level system in an entire number of the Erbium ions, and used as a parameter to represent a pumping state of the EDF. As a result of a measurement of this population inversion ratio and the gain efficiency of the EDF, the relation between the population inversion ratio and the gain efficiency of the EDF as shown in FIG. 2 was obtained. It can be seen in FIG. 2 that, in order to suppress the deterioration in the gain efficiency due to the concentration quenching, it is important to have the EDF operate at a population inversion ratio of 0.6 or less.

Figure 31:
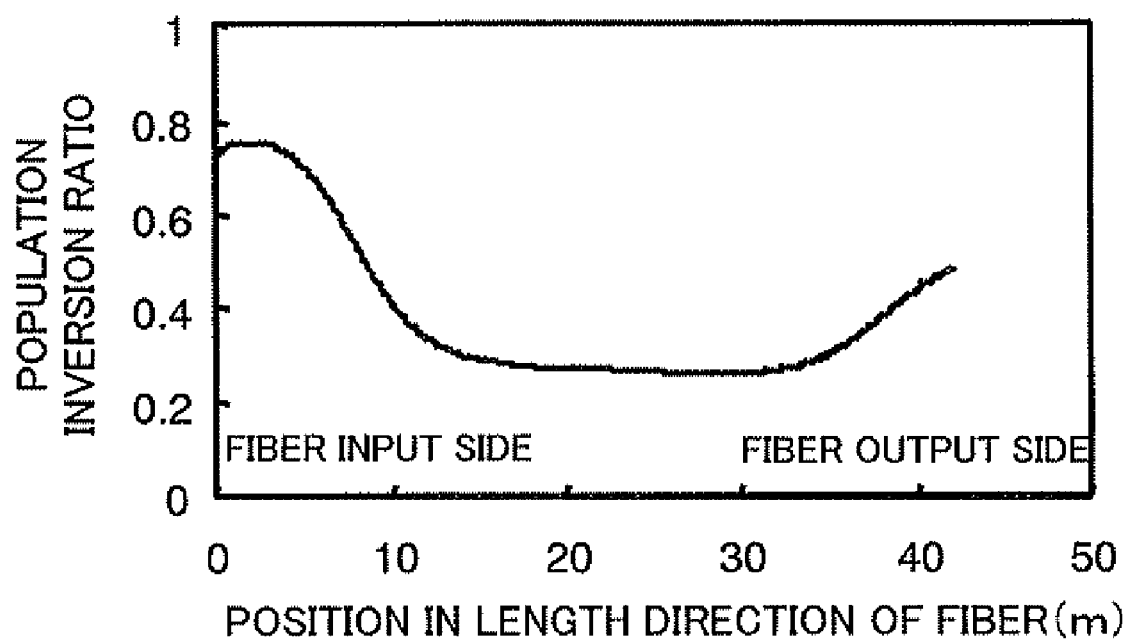
FIG. 31 is a diagram showing distance characteristics of a population inversion ratio for the EDF according to one embodiment of the present invention.

Generally, in the optical amplification in the L band by the EDF, a region where a population inversion ratio is low in average (0.4 or less) is used. However, in a direction of a length of the fiber, there is a region where the EDF operates at a population inversion ratio that is locally high (0.8 or less), and it is known that the deterioration in the gain efficiency due to concentration quenching occurs in this region. Specifically, as can be seen from an example of the population inversion ratio profile in the direction of the length of the fiber as shown in FIG. 31, the population inversion ratio on an input side of the fiber is in particular greater than that in the other regions of the fiber. This indicates that, the deterioration in the gain efficiency due to the concentration quenching mainly occurs on the input side of the fiber. It should be noted that FIG. 31 shows the population inversion ratio of the Erbium ions in the fiber taking the direction of the length of the fiber as a lateral axis, when the EDF as the amplifying medium is irradiated with pump light of 1480 nm from front and back sides to attempt an optical amplification in the L band.

Here, when using the EDF 10 having the refractive index distribution described with reference to FIG. 1, as can be seen from wavelength dependency of beam profiles of signal light and pump light shown in FIG. 3, the first core portion 1 is provided at a region where power of pump light in 980-nm band is concentrated (see a reference numeral 31), and the population inversion ratio tends to be high. On the other hand, the second core portion 2 is provided at a region where a power density of the pump light tends to be lower than that in the first core portion 1 and the population inversion ratio tends to be lower than that in the first core portion 1, because pumping occurs by a leak of the pump light mainly in 1480-nm band (bottom portion of the beam profile indicated by a reference numeral 33). In other words, the first core portion 1 is more susceptible to the deterioration in the gain efficiency due to the concentration quenching than the second core portion 2 is. It should be noted that a reference numeral 32 indicates a beam profile of signal light (wavelength 1590 nm).

In order to reduce an influence of the concentration quenching, the EDF according to this example utilize the wavelength dependency of the above beam profile to control the pump light of two types of wavelengths (980 nm and 1480 nm), thereby optimizing the population inversion ratio in the second core portion 2. At this time, in order to improve controllability of the population inversion ratio in the second core portion 2, it is necessary to design core diameters of the first core portion 1 and the second core portion 2 such that an amount of the leak of pump light in 980 nm to the second core portion 2 is made smaller than the leak of pump light in 1480 nm, and the population inversion ratio in the second core portion 2 is determined by the pump light in 1480 nm.

Generally, for example, when a plurality of pump light are incident to the first core portion 1 and the second core portion 2, the core diameters of the first core portion 1 and the second core portion 2 are designed so that the pump light to the first core portion 1 in a wavelength band having a beam profile with lower confinement becomes more dominant to contribution to change in the population inversion ratio in the second core portion 2 than the pump light to the first core portion 1 in a wavelength band having a beam profile with higher confinement effect.

Figures 25, 26:
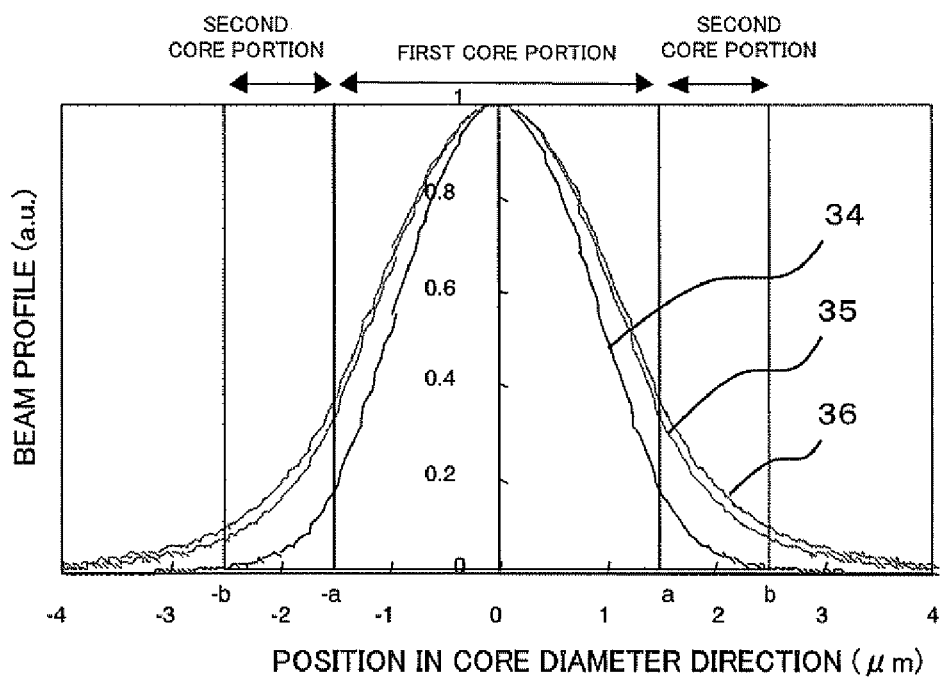
FIG. 25 is a diagram showing wavelength dependency of the beam profile in a fiber according to one embodiment of the present invention.
FIG. 26 is a diagram showing relation between a core diameter of an EDF according to one embodiment of the present invention and a parameter η.

A method of determining the core diameters is described with reference to FIG. 25. FIG. 25 shows beam profiles of signal light (wavelength of 1590 nm (see a reference numeral 36)) and pump light (wavelength of 980 nm (see a reference numeral 34) and wavelength of 1480 nm (see a reference numeral 35)) in the fiber of the present example. The pump light with shorter wavelength of 980 nm has a stronger confinement in the fiber and a smaller base in the beam profile. In contrast, the beam profiles with longer wavelengths of 1480 nm and 1590 nm have wider bases in the beam profiles.

Here, assuming the core diameter of the first core portion 1 is a, the core diameter of the second core portion 2 is b, overlap ratios of beam profiles in a wavelength $\lambda$ in the first core portion 1 and the second core portion 2 are represented by Equations (1) and (2) as follows.

$$\text{First Core Portion 1:} \Gamma_1(\lambda) = \frac{\int_0^a f(\lambda, r)\,dr}{\int_{-\infty}^{\infty} f(\lambda, r)\,dr} \quad (1)$$

$$\text{Second Core Portion 2:} \Gamma_2(\lambda) = \frac{\int_a^b f(\lambda, r)\,dr}{\int_{-\infty}^{\infty} f(\lambda, r)\,dr} \quad (2)$$

Here, $f(\lambda, r)$ is a beam profile function, and r is a position in a direction of the core diameter. Here, a parameters $\eta$ indicating confinement ratios into the second core portion 2 of the pump light of 980 nm and the pump light of 1480 nm is defined as shown by Equation (3) as follows.

$$\eta = \frac{\Gamma_2(1480)}{\Gamma_2(980) + \Gamma_2(1480)} \quad (3)$$

In the present example, as $\eta$ becomes larger, the contribution of the pump light of 1480 nm to the population inversion ratio in the second core portion 2 becomes greater, and the controllability of the population inversion ratio in the second core portion 2 is improved. The following shows a design example of $\eta$.

For example, assuming a relative refractive index difference $\Delta 1$ of the first core portion 1 is 1.6%, and a relative refractive index difference $\Delta 2$ of the second core portion 2 is 0.1%, relation among $\eta$ and the core diameter a of the first core portion 1 and the core diameter b of the second core portion 2 is as shown in FIG. 26. In FIG. 26, values of $\eta$ corresponding to the core diameters a and b are indicated. However, a portion indicated by x* represents as being inadequate for not having a mode for the signal light, and a portion indicated by x represents as being inadequate for having multiple modes for the signal light. Specifically, it is necessary to set the core diameters a, and b of the first core portion 1 and the second core portion 2 such that the contribution to the change of the population inversion ratio in the second core portion 2 due to the pump light in a wavelength band having a beam profile with a lower confinement effect to the first core portion 1 (here, pump light of 1480 nm) than the pump light in the wavelength band, i.e. the above parameter $\eta$, becomes maximum, in a range in which the pump light in the wavelength band having a beam profile with a higher confinement effect to the first core portion 1 (here, pump light of 980 nm) propagates in a single mode. It can be seen from FIG. 26** that $\eta$ becomes maximum when a is 3 µm, and b is 9 µm, and thus the most appropriate core diameters can be determined.

Figures 27, 28:
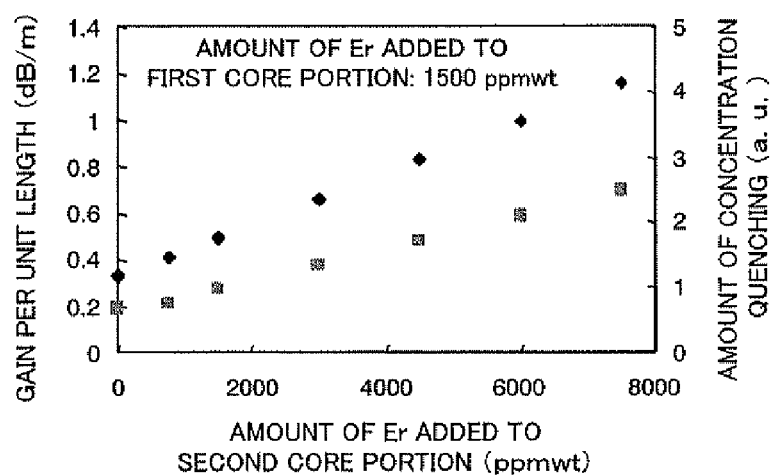
FIG. 27 is a diagram showing an example of EDF parameters according to one embodiment of the present invention.
FIG. 28 is a diagram showing relation between an Erbium ion concentration in the second core portion of the EDF according to one embodiment of the present invention and gain per unit length as well as an amount of concentration quenching.

Next, a method of optimization of the Erbium ion concentrations in the first core portion 1 and the second core portion 2 is examined taking a fiber structure having the parameters as shown in FIG. 27 as an example. At this time, the Erbium ion concentration of the first core portion 1 is fixed to 1500 ppm, and the Erbium ion concentration in the second core portion 2 is varied from 0 to 7500 ppm to measure amplification characteristics.

FIG. 28 shows measurement results of the amplification characteristics. In FIG. 28, a filled rhomboidal figure represents a gain per unit length and a filled square figure represents an amount of the concentration quenching. As can be seen from FIG. 28, when the Erbium ion concentration in the second core portion 2 increases, the Erbium ion concentration in the fiber as a whole also increases, increasing the gain per unit length. On the other hand, when the Erbium ion concentration in the second core portion 2 increases, the amount of the concentration quenching also increases, increasing the effect of the concentration quenching. Accordingly, while increasing the Erbium ion concentration in the second core portion 2 decreases the EDF length required to obtain a predetermined gain and reduces the influence of the FWM, it also increases the effect of the concentration quenching, and makes the efficiency deterioration larger.

Figures 29, 30:
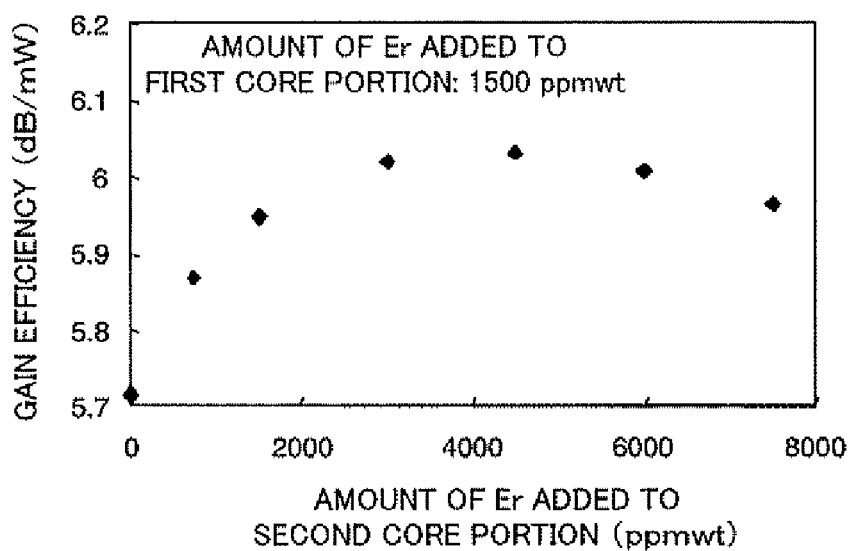
FIG. 29 is a diagram showing relation between an Erbium ion concentration in the second core portion of the EDF according to one embodiment of the present invention and gain efficiency.
FIG. 30 is a diagram showing the EDF length and required pump power for the Erbium ion concentration in the second core portion of the EDF according to one embodiment of the present invention.

Here, the gain efficiency is shown with reference to FIG. 29. FIG. 29 takes the Erbium ion concentration in the second core portion 2 on the lateral axis and the gain efficiency of the fiber on the vertical axis to represent relation between the Erbium ion concentration and the gain efficiency.

It can be seen from FIG. 29 that the gain efficiency of the EDF increases according to the increase of the Erbium ion concentration in the second core portion 2, and the gain efficiency starts to deteriorate once the Erbium ion concentration exceeds a certain amount. Thus, it can be seen that there is the Erbium ion concentration in the second core portion 2 at which the gain efficiency is optimized. This is because the EDF length required to obtain the predetermined gain becomes longer when the Erbium ion concentration in the second core portion 2 is small, and an excess loss in the fiber causes the deterioration of the gain efficiency, while an increase in the Erbium ion concentration in the second core portion 2 increases the effect of the concentration quenching in the second core portion 2, and the gain efficiency deteriorates. It can be seen from FIG. 29 that the Erbium ion concentration in the second core portion 2 should be set to a value for a region in which the gain efficiency turns from increasing to decreasing.

Here, assuming that the Erbium ion concentration in the first core portion 1 is 1500 ppm, and the Erbium ion concentration in the second core portion 2 is 0 ppm, 4500 ppm, and 7500 ppm, the EDF length and pump power required when signals with an input power of −16.4 dBm/ch at 80 waves are amplified with gain 20.5 dB is shown in FIG. 30. As can be seen from FIG. 30, the EDF length becomes shorter as the Erbium ion concentration in the second core portion 2 becomes larger. However, making the Erbium ion concentration to be added to the second core portion 2 too large will require more pump power. Accordingly, in designing the EDF, it is necessary to select an optimum Erbium ion concentration to be added to the second core portion 2 considering priority between the EDF length and required pump power.

In the optical fiber as described above, the Erbium ion concentration is set higher in a region where the population inversion ratio tends to be lower due to the wavelength dependency of the beam profile when the pump light of multiple wavelength bands propagate through the core portions. As a result, it is possible to improve the gain efficiency.

Figure 4:
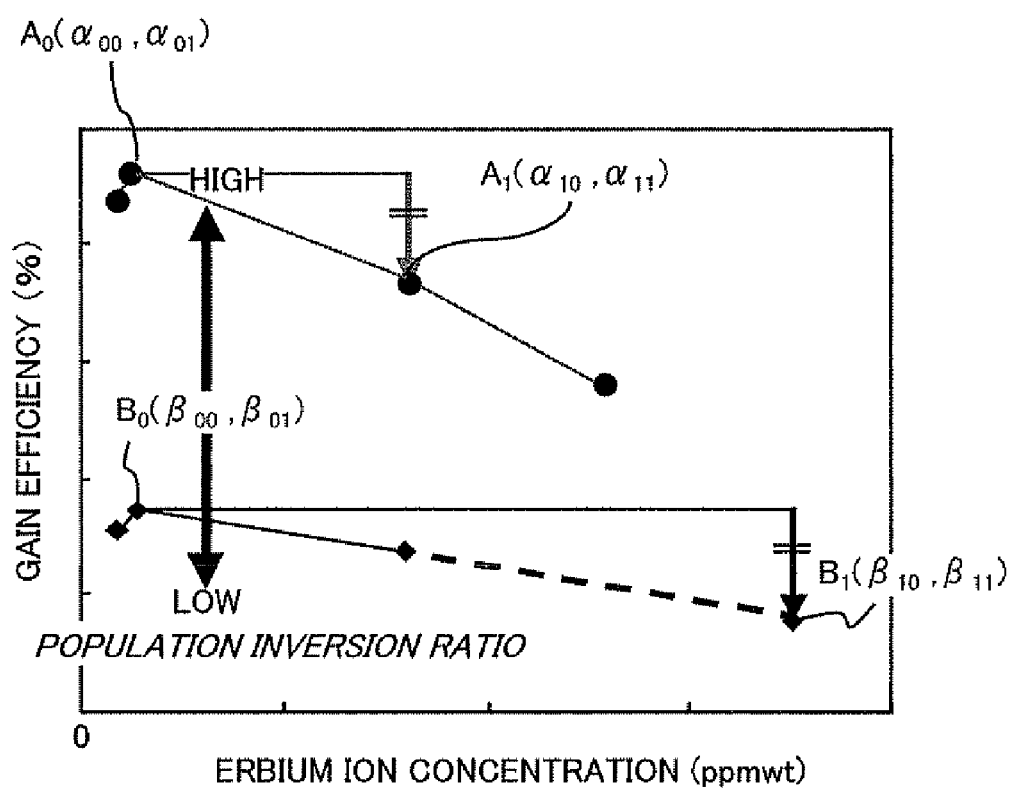
FIG. 4 is a diagram showing relation between a concentration of the Erbium ions added to a core portion and gain efficiency of the EDF, according to the present embodiment.

As one example, FIG. 4 shows relation between the Erbium ion concentrations and the gain efficiencies respectively in the first core portion 1 and the second core portion 2 of the EDF 10 according to the present embodiment when the population inversion ratio is taken as a parameter. As described above, the greater the population inversion ratio is, the more easily the deterioration in the gain efficiency due to the concentration quenching occurs. Consequently, a degree of deterioration in the gain efficiency to the increase in the Erbium ion concentration also becomes larger. Therefore, the relation between the Erbium ion concentration and the gain efficiency in the first core portion 1 varies according to filled circles. On the other hand, because the population inversion ratio of the second core portion 2 is smaller, the relation between the Erbium ion concentration and the gain efficiency varies according to filled rhomboidal figures. In other words, an inclination of an amount of deterioration in the gain efficiency to the Erbium ion concentration in the first core portion 1 is greater than that in the second core portion 2.

Here, in order to describe a method to determine the concentration of the Erbium ions added to the first core portion 1 and the second core portion 2 of the EDF 10 according to the present embodiment, points $A_0$, $B_0$, $A_1$, and $B_1$ are set in FIG. 4, respectively representing states of the Erbium ion concentrations of the first core portion 1 and the second core portion 2. Coordinates of each point represents the Erbium ion concentration and the gain efficiency at each state, and values of the coordinates are represented as $A_0$ ($\alpha_{00}$, $\alpha_{01}$), $B_0$ ($\beta_{00}$, $\beta_{01}$), $A_1$ ($\alpha_{10}$, $\alpha_{11}$), and $B_1$ ($\beta_{10}$, $\beta_{11}$), where $0<\alpha_{00}<\alpha_{10}$, $0<\alpha_{11}<\alpha_{01}$, $0<\beta_{00}<\beta_{10}$, and $0<\beta_{11}<\beta_{01}$.

At this time, the amount of deterioration in the gain efficiency is measured as the Erbium ion concentrations in the first core portion 1 and the second core portion 2 increase, taking the point $A_0$ and the point $B_0$ at which the Erbium ion concentration in the first core portion 1 is equal to the Erbium ion concentration in the second core portion 2 as standards ($\alpha_{00}=\beta_{00}$).

Next, the point $A_1$ is appropriately determined, and then an amount of deterioration in the gain efficiency ($\alpha_{01}-\alpha_{11}$) due to the change in the Erbium ion concentration in the first core portion 1 is obtained.

With this, it is possible to determine the point $B_1$ for the second core portion 2 at which the amount of deterioration in the gain efficiency ($\alpha_{01}-\alpha_{11}$) due to the change of the Erbium ion concentration in the first core portion 1 becomes equal to an amount of deterioration in the gain efficiency ($\beta_{01}-\beta_{11}$) due to the variation of the Erbium ion concentration in the second core portion 2.

By setting the Erbium ion concentrations $\alpha_{10}$ and $\beta_{10}$ at the point $A_1$ and the point $B_1$ at this time as the concentrations of the Erbium ions respectively to be added to the first core portion 1 and the second core portion 2, the Erbium ion concentration for the EDF 10 according to the present embodiment is determined.

Specifically, by doping with the Erbium ions so that the amounts of deterioration in the gain efficiency in the first core portion 1 and the second core portion 2 are equal, it is possible to make the concentration of the Erbium ions added to the second core portion 2 larger than in the conventional EDF, thereby increasing an average value of the Erbium ion concentration as a whole. Thus, it is possible to reduce the length of the EDF while maintaining the gain efficiency equivalent to that of the conventional EDF, and as described later, FWM crosstalk can be reduced in comparison with the conventional example.

(B) Explanation of EDFA using EDF

Figure 5:
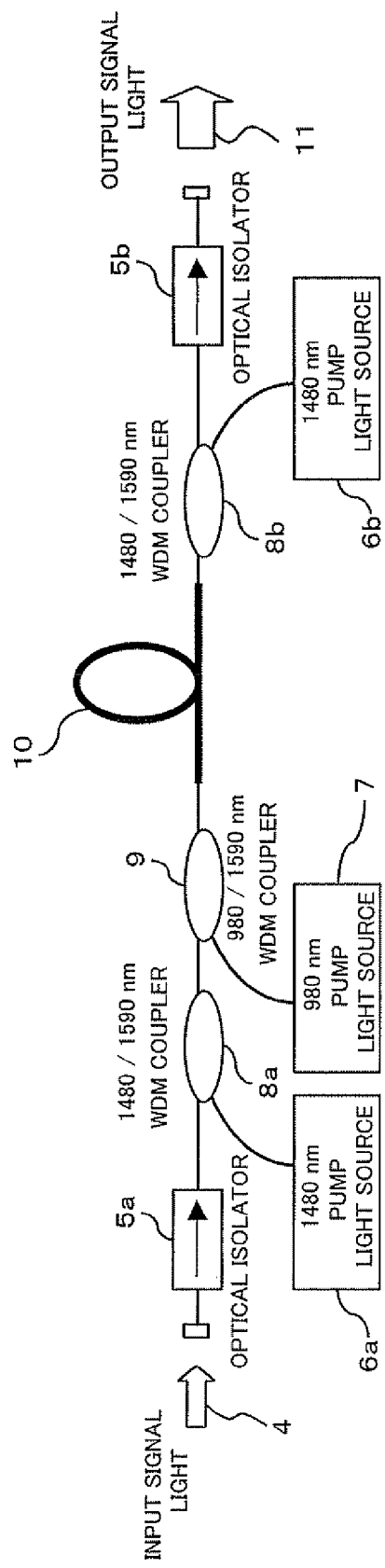
FIG. 5 is a diagram showing a configuration of an EDFA using the EDF shown in FIG. 1.

FIG. 5 shows a configuration of an EDFA using the above EDF 10. As shown in FIG. 5, the EDFA according to the present embodiment is configured such that a preceding stage of the EDF 10 as an amplifying medium is provided with an optical isolator 5a for preventing light backscattering from the EDF 10, a 1480-nm pump light source 6a and a 980-nm pump light source 7 for respectively providing 1480-nm band light and 980-nm band light as pump light for forward pumping, and a 1480/1590-nm WDM coupler 8a and a 980/1590-nm WDM coupler 9 for respectively coupling signal light (for example, 1590 nm band light) and the two types of pump light (1480-nm band and 980-nm band), and such that a succeeding stage of the EDF 10 is provided with a 1480-nm pump light source 6b for providing 1480-nm band light as pump light for backward pumping, a 1480/1590-nm WDM coupler 8b for coupling the pump light (1480-nm band) and signal light (1590-nm band), and an optical isolator 5b for preventing reflection light.

Specifically, in the present embodiment, the above two kinds of pump light (1480-nm band and 980-nm band) are incident as forward pump light along with signal light (1590-nm band) in order to efficiently control the population inversion ratio of the EDF 10, and the pump light (1480-nm band) on the long wavelength side is incident as backward pump light in order to suppress a noise component in the pump light. As a whole, a bidirectional pumping configuration is formed provided with the pump light sources 6a, 6b, and 7 on the preceding and succeeding stages of the EDF 10. However, depending on a case, pumping method such as forward pumping, backward pumping, or reflection pumping can also be employed.

In the EDFA configured as above, first, an input signal light 4 is incident to the optical isolator 5, and then, coupled with the pump light in the 1480-nm band at the 1480/1590-nm WDM coupler 8, and with the pump light in the 980-nm band at the 980/1590-nm WDM coupler 9, to be incident into the EDF 10. In the EDF 10, the signal light receives energy from the Erbium ions pumped by the pump light from the preceding and succeeding stages, and is amplified. At this time, although the noise component is also amplified along with the signal light, an S/N ratio is improved because the amplification efficiency for the signal light is greater. Then, the signal light is outputted as output signal light 11 through the succeeding optical isolator 5.

Figure 3:
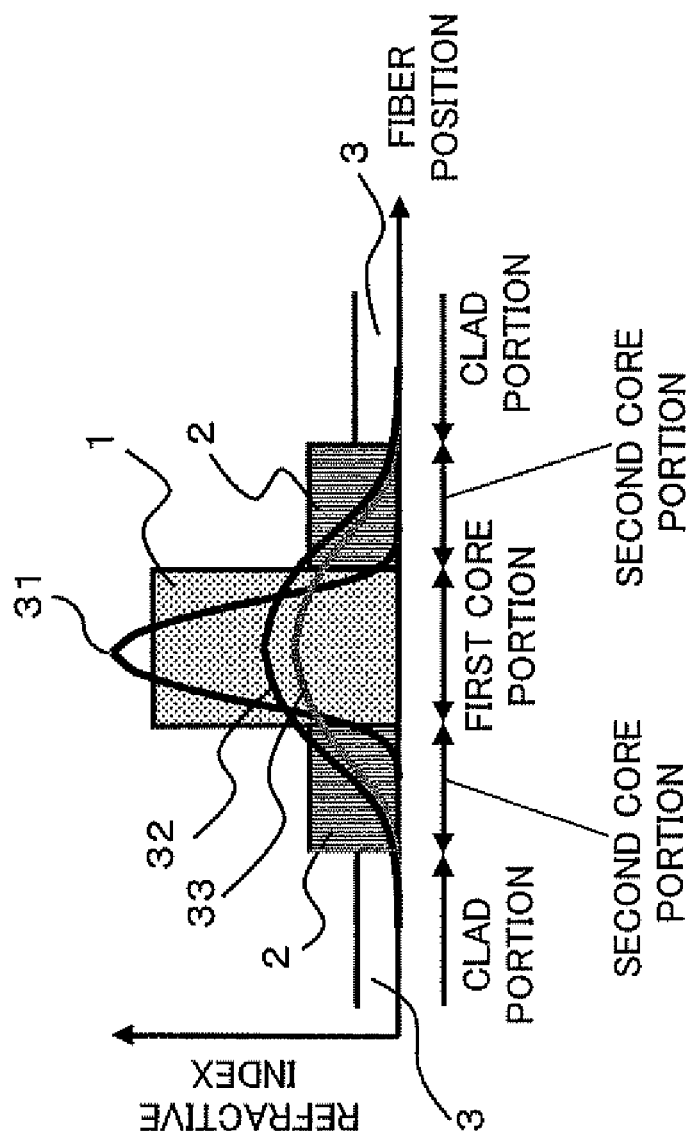
FIG. 3 is a diagram showing a beam profile of the EDF according to the present embodiment.

At this time, as can be seen from the beam profile of the pump light shown in FIG. 3, the 980-nm band pump light has a strong confinement effect in the EDF 10 and propagates mainly in the first core portion 1. On the other hand, the confinement effect in the EDF 10 of the 1480-nm band pump light having a long wavelength is weak in comparison with that of the 980-nm band pump light, the leak to the second core portion 2 is large. Accordingly, by changing the power ratio of the two kinds of the pump light, the population inversion ratios in the first core portion 1 and the second core portion 2 can be easily controlled without changing the fiber structure. With this configuration, it is possible to easily optimize the population inversion ratio of the second core portion to be 0.6 or less to suppress the gain efficiency deterioration due to the concentration quenching.

Next, an effect of FWM suppression by the EDF 10 according to the present embodiment is described.

The length of the EDF is determined based on an absorption coefficient α which is determined according to Equation (4) as follows. The greater the α is, the shorter the EDF length can be.

$$\alpha = \sigma a \times Nt \times \Gamma \qquad (4)$$

Here, $\sigma a$ is an absorption cross section, Nt is an average Erbium ion concentration, and $\Gamma$ is an overlap constant. The $\sigma a$ is a value determined based on the composition of the fiber, and is set here to be a constant value. Comparison between the EDF 10 according to the present embodiment and the conventional EDF is conducted for the (Nt×Γ) that is dependent on the fiber structure.

Figure 6:
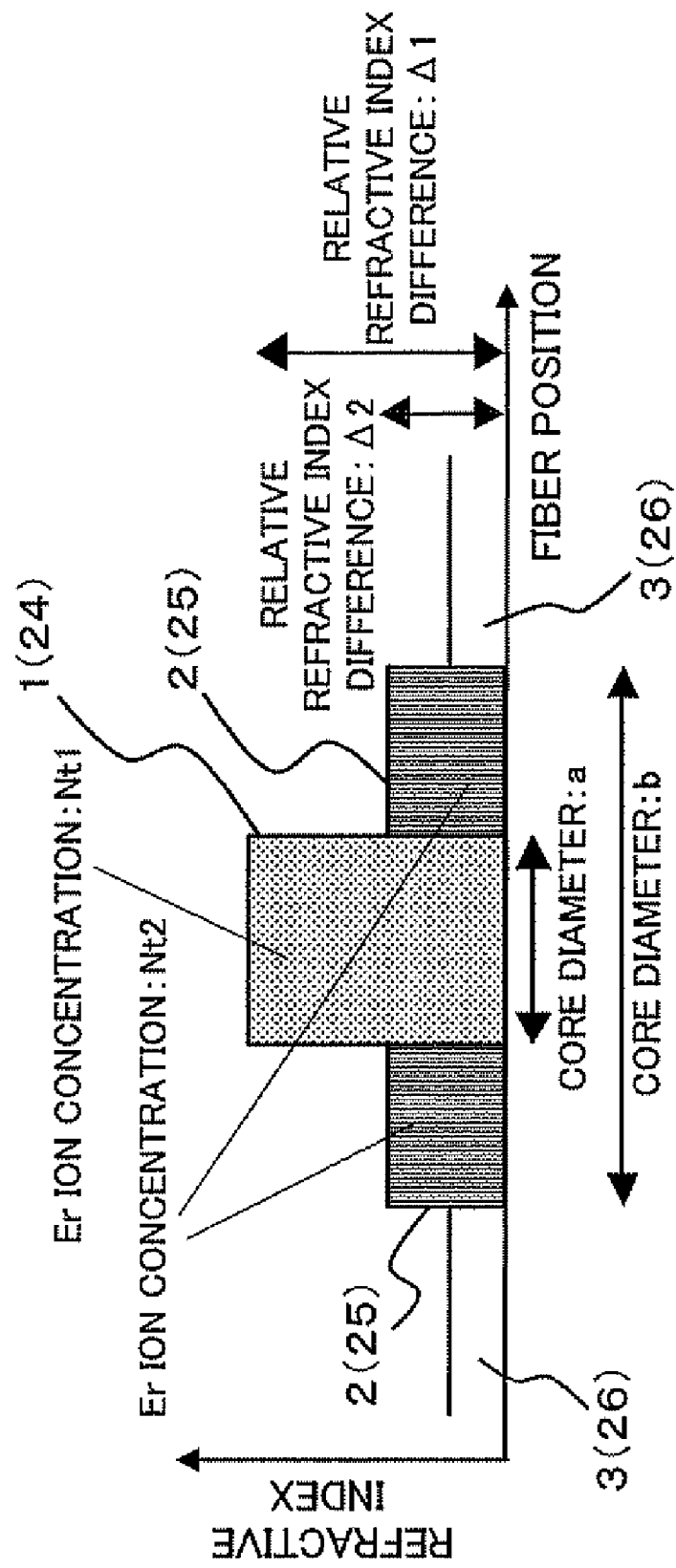
FIG. 6 is a diagram defining parameters of the EDF according to the present embodiment.
Figure 8:
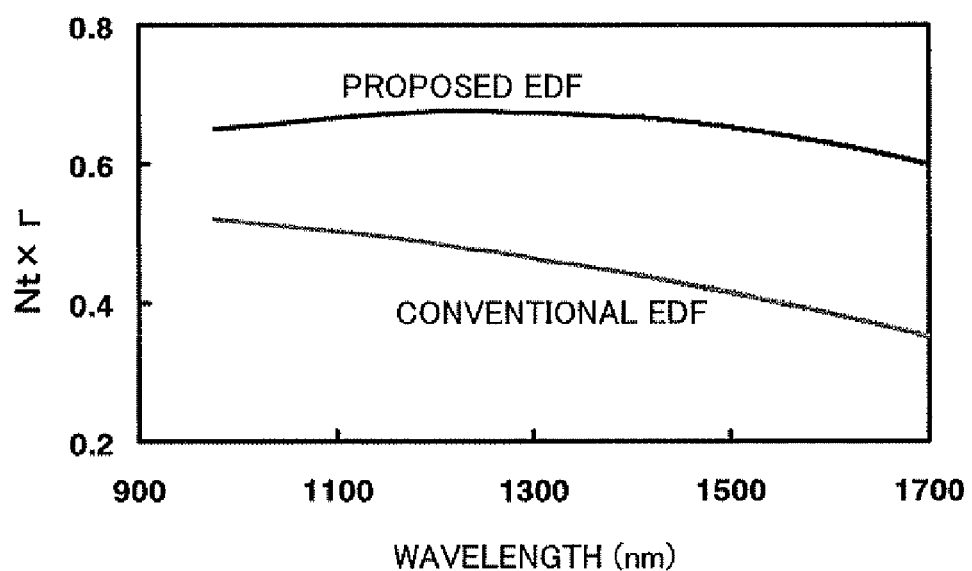
FIG. 8 is a diagram showing wavelength characteristics of (Nt×Γ) values of the conventional EDF and the EDF according to the present embodiment.
Figure 21:
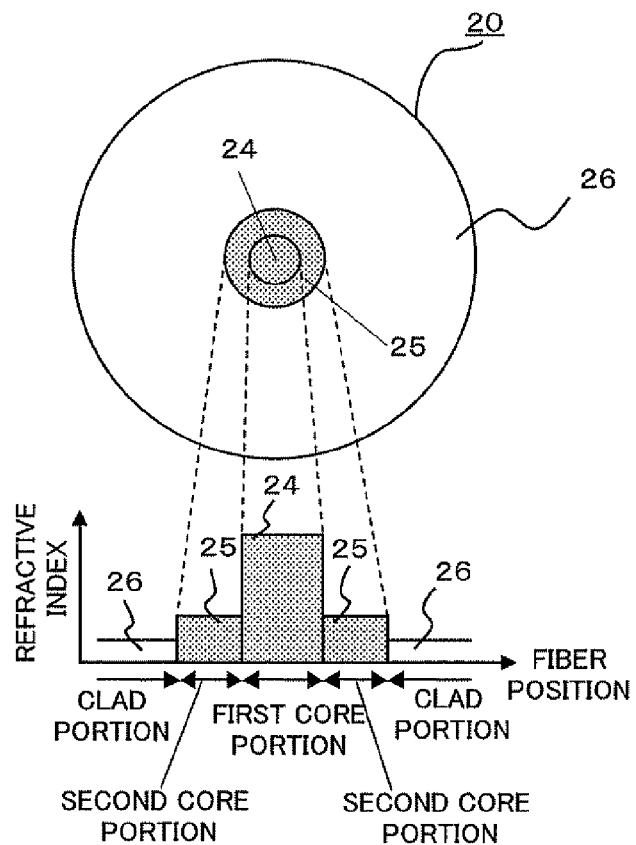
FIG. 21 is a diagram showing a cross-sectional structure of the conventional EDF provided with a first core portion and a second core portion, and its refractive index distribution.
Figure 22:
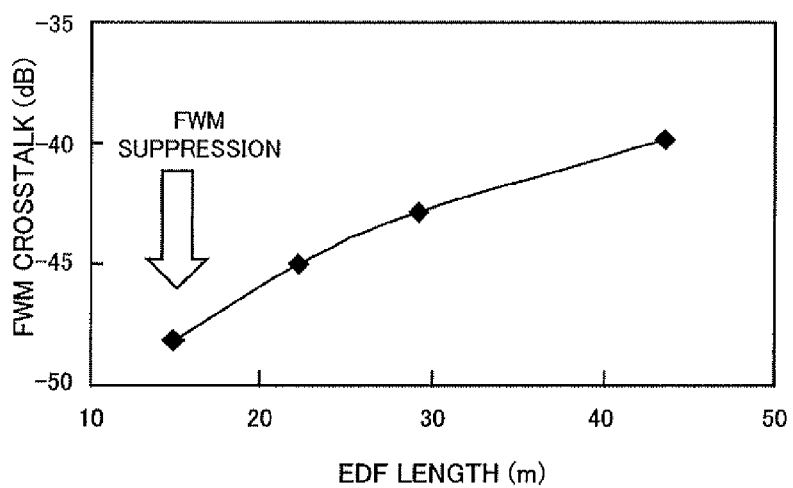
FIG. 22 is a diagram showing relation between an EDF length of the EDF and the amount of the FWM crosstalk.
Figure 23:
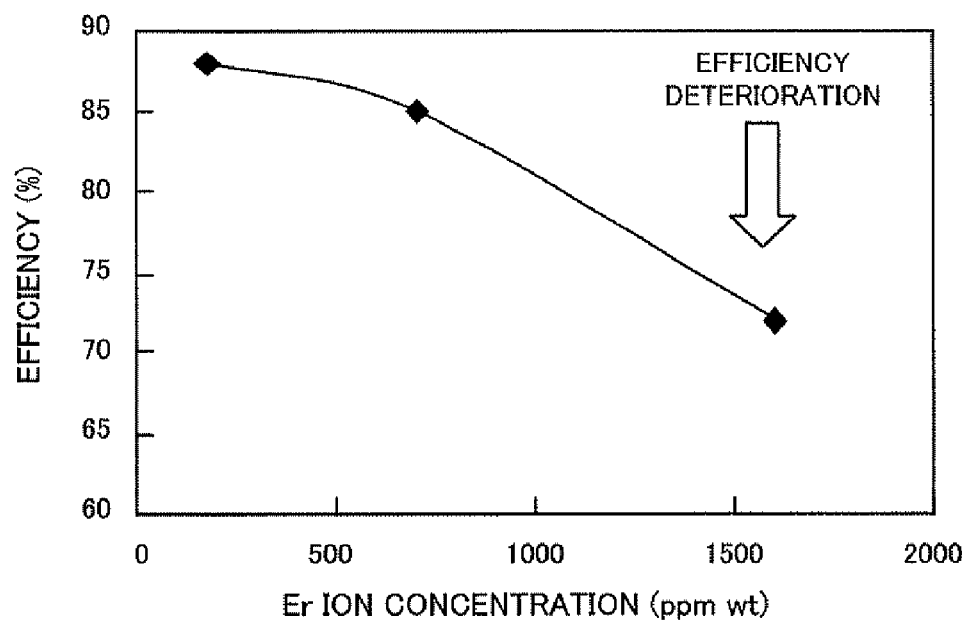
FIG. 23 is a diagram showing relation between the concentration of the Erbium ions added to the core portion of the EDF and the gain efficiency of the EDF.
Figure 24:
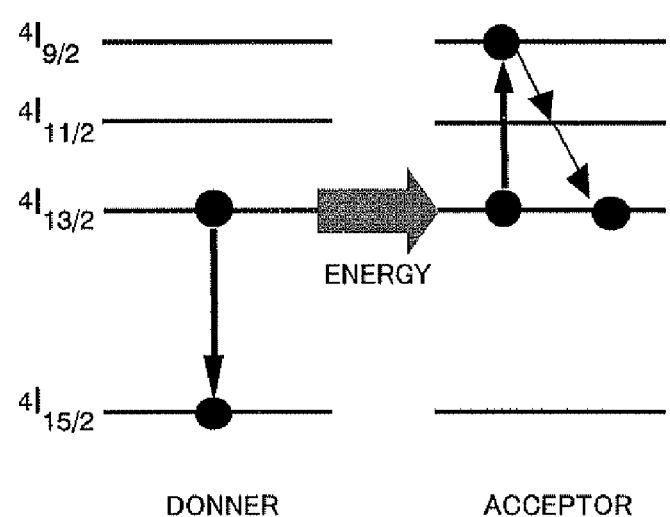
FIG. 24 is a diagram showing a principle of concentration quenching.

The EDF 10 is taken as an example of the EDF 10 proposed by the present embodiment, in which the concentration of the Erbium ions to be added to the second core portion 2 is three times as large as the concentration of the Erbium ions to be added to the first core portion 1, and an EDF 20 is taken as the conventional EDF, in which the Erbium ions are added evenly to a first core portion 24 and a second core portion 25 as shown in an upper side of FIG. 21, and with a refractive index distribution as shown in a lower side of FIG. 21. It should be noted that, parameters used for the calculation are as shown in FIG. 6 and FIG. 7, and the parameters other than the concentration of the Erbium ions to be added to the core portions are common. Results of the calculation are shown in FIG. 8 as relation between the wavelength of the pump light and the value of (Nt×Γ). As can be seen from FIG. 8, the EDF 10 proposed by the present embodiment has a greater value of the (Nt×Γ) than the EDF 20 with the conventional structure in both the 980-nm band and the 1480-nm band. Therefore, it is possible to make the EDF length shorter while suppressing the decrease in the gain efficiency.

Figure 9:
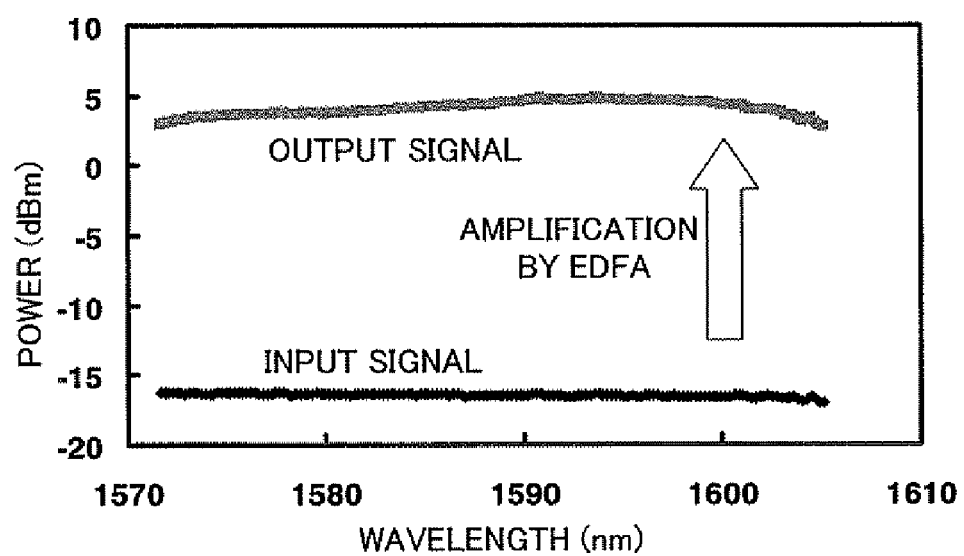
FIG. 9 is a diagram showing an example of gain efficiency required for the EDFA.

As a matter of fact, when obtaining the EDF length that is required in order to realize amplification characteristic as shown in FIG. 9 for an input signal in the L band (25 GHz interval and 160 waves), while 41.1 m was necessary in the conventional EDF 20, the EDF 10 of the present example could obtain desired gain efficiency at a length of 24.8 m.

Figure 10:
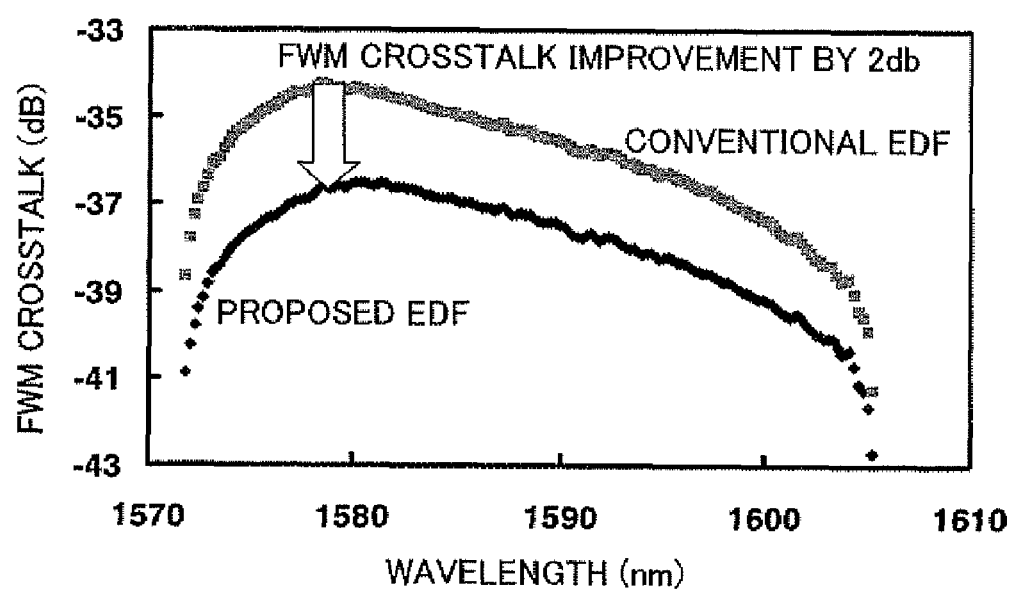
FIG. 10 is a diagram showing wavelength characteristics of amounts of FWM crosstalk of the conventional EDF and the EDF according to the present embodiment.
Figure 11:
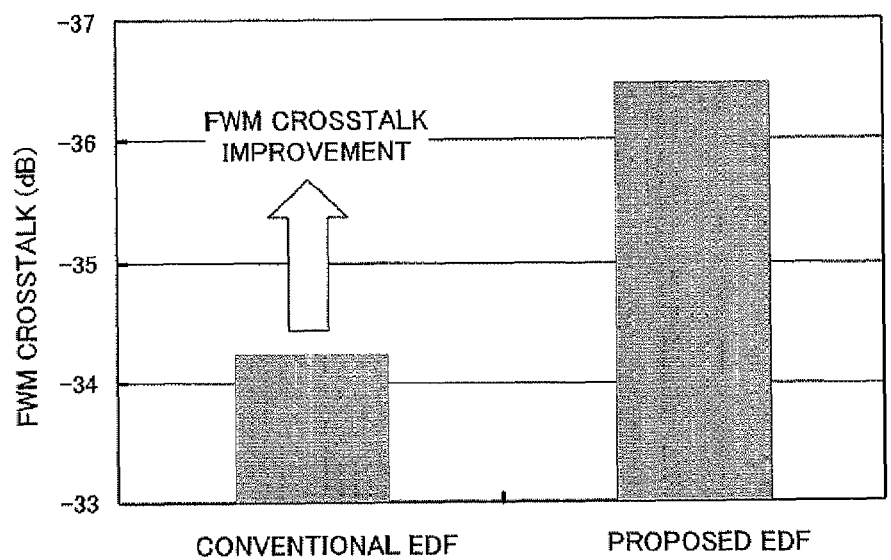
FIG. 11 is a diagram comparing the amounts of the FWM crosstalk of the conventional EDF and the EDF according to the present embodiment at a point where the amount of the FWM crosstalk in the EDF according to the present embodiment is the largest.

Further, the FWM occurrences when using the EDFs 10 and 20 are also measured. FIG. 10 shows wavelength characteristic of amounts of the FWM crosstalk that occur in the EDFs 10 and 20, respectively. FIG. 11 shows comparison results between the EDF 10 of the present embodiment and the conventional EDF 20 at the wavelength at which the amount of the FWM crosstalk of the EDF 10 demonstrates a maximum.

It can be seen from these results that, by using the EDF 10 according to the present embodiment, it is possible to suppress both the amount of the FWM crosstalk and the deterioration in the gain efficiency.

As described above, according to the present embodiment, by improving the amplification performance of the optical amplifier (EDFA) while suppressing the deterioration in the gain efficiency due to the concentration quenching, it is possible to provide an optical amplifier suitable as a key device required for increasing the capacity of an optical communications system. At the same time, it is possible to suppress the power of the pump light required for amplifying the signal light in comparison with the conventional example, thereby significantly contributing to a cost reduction of the optical amplifier.

(C) Explanation of Manufacturing Method of EDF

Next, a manufacturing method of the above described EDF 10 is explained.

When manufacturing the fiber structure of the EDF 10 as shown in FIG. 1, it is necessary to be able to set the concentrations of the Erbium ions to be added to the first core portion 1 and the second core portion 2 separately. Therefore, the manufacturing method of the EDF 10 according to the present embodiment includes three steps as described below.

(1) Producing First Core Portion 1

Figure 12:
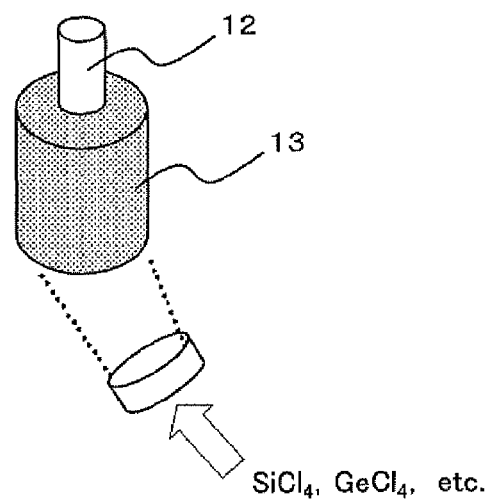
FIG. 12 is a diagram showing a formation method of a glass porous body in a first step of a manufacturing method of the EDF according to the present embodiment as shown in FIG. 1.

In a first step, the first core portion 1 is produced using a VAD (Vapor Axial Deposit) method as shown in FIG. 12, for example. Specifically, silicon tetrachloride ($SiCl_4$), germanium chloride ($GeCl_4$), and the like are applied with a gas burner while rotating a glass rod 12, and silicon dioxide ($SiO_2$) is deposited around the glass rod 12 to form a glass porous body 13.

Figure 13:
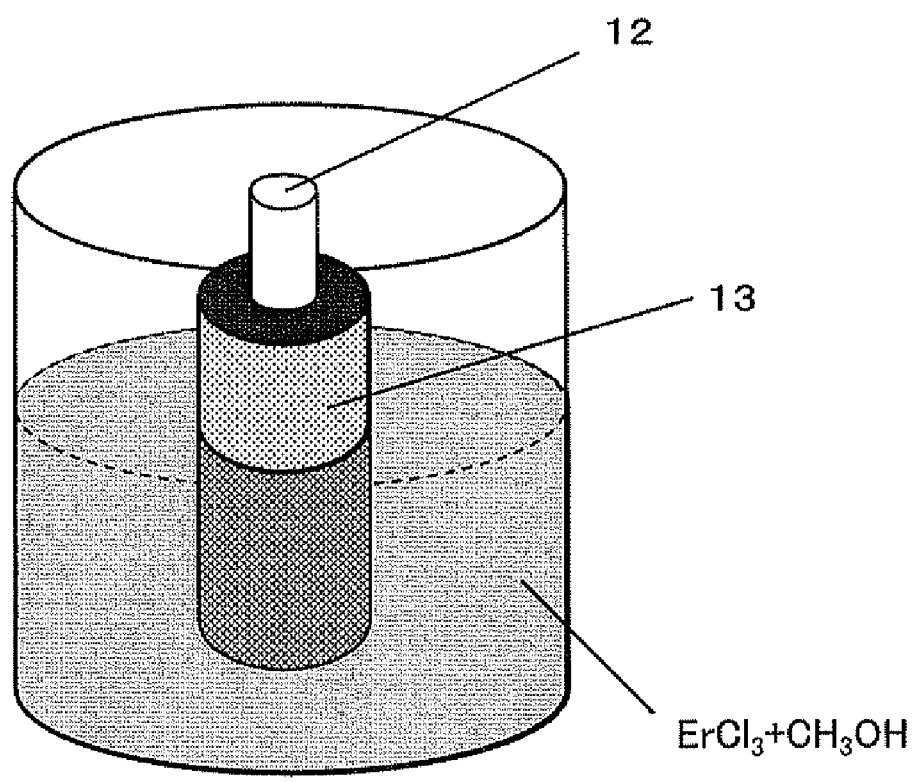
FIG. 13 is a diagram showing a method of doping the glass porous body with the Erbium ions in the first step of the manufacturing method of the EDF according to the present embodiment as shown in FIG. 1.

Next, the glass porous body 13 is immersed in a methanol ($CH_3OH$) solution of erbium chloride ($ErCl_3$), for example, as shown in FIG. 13, thereby doping the first core portion 1 with the Erbium ions of a desired concentration. It should be noted that other examples of the doping method of the Erbium ions can include a method in which gaseous erbium chloride is applied. Further, because the concentration of the Erbium ions to be added at this time is determined by a size of a hole in the glass porous body 13, controlling the size of the hole in producing the glass porous body 13 provides a first preform 16 having a desired Erbium ion concentration (see FIG. 16).

(2) Producing Second Core Portion 2 and Clad Portion 3

Figure 14:
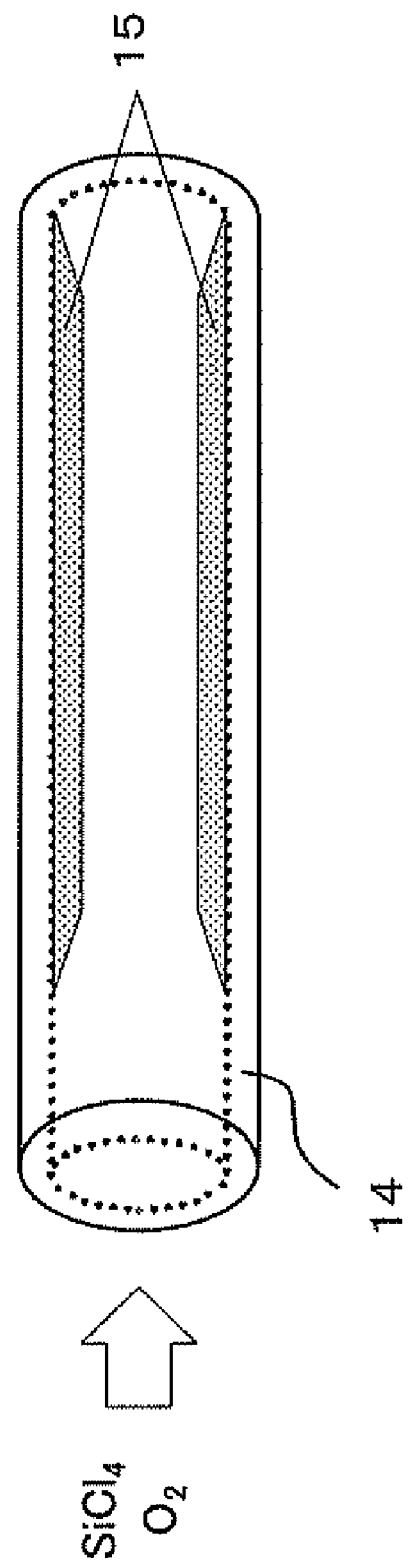
FIG. 14 is a diagram showing a formation method of a glass porous body in a second step of the manufacturing method of the EDF according to the present embodiment as shown in FIG. 1.

In a second step, the second core portion 2 and the clad portion 3 are produced using MCVD (Modified Chemical Vapor Deposition) method, for example, as shown in FIG. 14. Specifically, silicon tetrachloride and oxygen ($O_2$) are flowed in a quartz glass tube 14, and heated with a gas burner or the like to react to be deposited as silicon dioxide, thereby forming a glass porous body 15.

Figure 15:
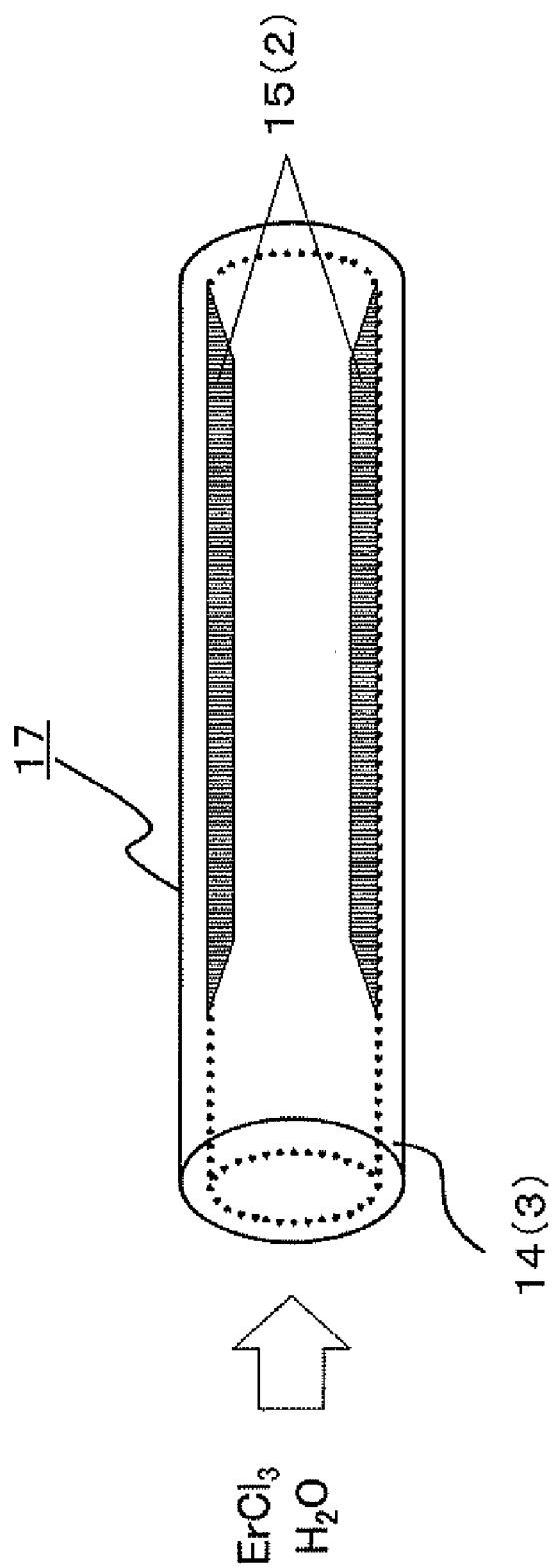
FIG. 15 is a diagram showing a method of doping the glass porous body with the Erbium ions in the second step of the manufacturing method of the EDF according to the present embodiment as shown in FIG. 1.

Then, an erbium chloride solution is introduced into the quartz glass tube 14 as shown in FIG. 15, and the glass porous body 15 is doped with the Erbium ions, thereby obtaining a second preform 17. The concentration of the Erbium ions can be controlled by changing a size of a hole in a glass porous body 18, as in the first step.

It should be noted that the quartz glass tube 14 corresponds to the clad portion 3 shown in FIG. 1, and the glass porous body 15 deposited inside the quartz glass tube 14 corresponds to the second core portion 2 shown in FIG. 1.

(3) Solidifying Preform

Figure 16:
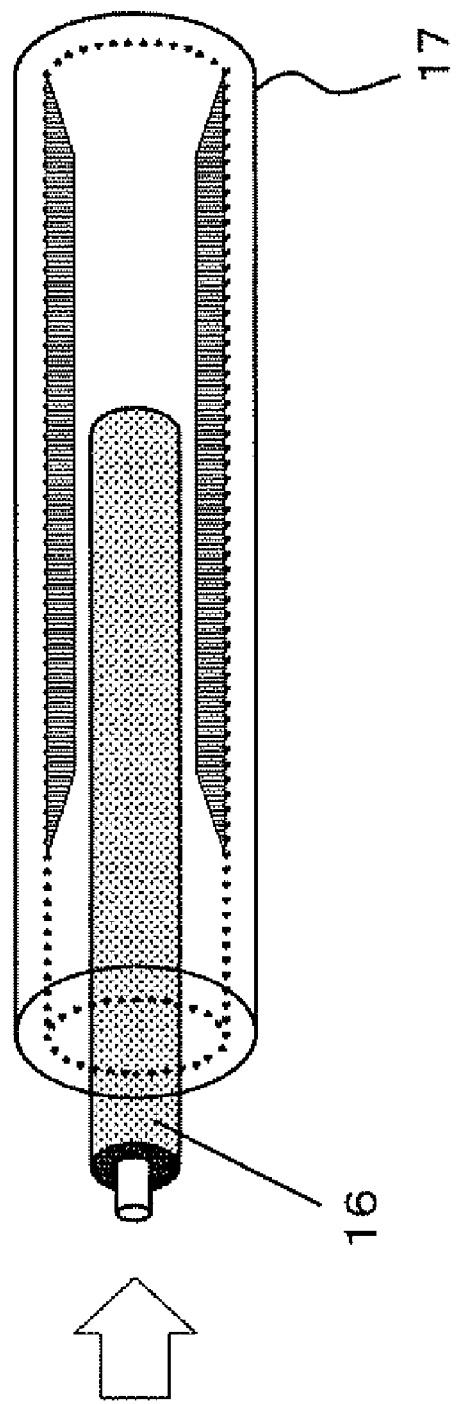
FIG. 16 is a diagram showing a formation method of a core portion in a third step of the manufacturing method of the EDF according to the present embodiment as shown in FIG. 1.
Figure 17:
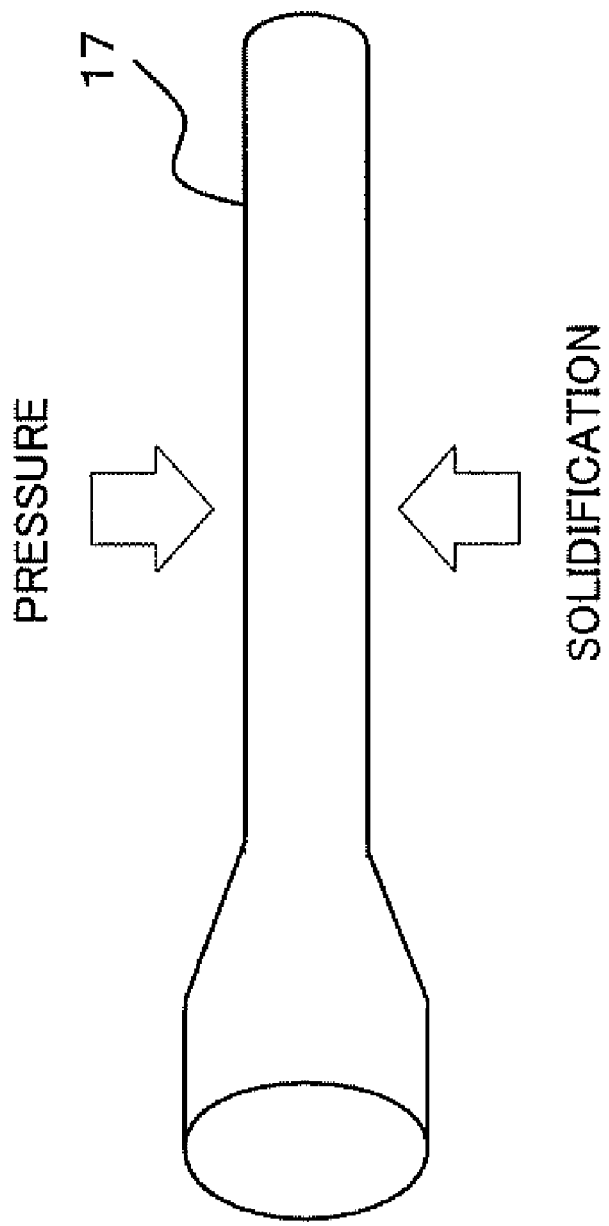
FIG. 17 is a diagram showing a solidifying method of a preform in the third step of the manufacturing method of the EDF according to the present embodiment as shown in FIG. 1.

Finally, as shown in FIG. 16, the first preform 16 produced in the first step is inserted into the second preform 17 produced in the second step, and then the preform is solidified by applying an external pressure as shown in FIG. 17.

According to the above described steps, the EDF 10 according to the present embodiment can be easily manufactured.

It should be noted that, by forming the glass porous bodies 13 and 15 in the first and second steps, respectively, as described above so that a proportion of pores in the second core portion 2 is greater than that of the first core portion 1, the concentration of the Erbium ions can be readily controlled, and the Erbium ion concentration in the second core portion 2 can be easily made higher than the Erbium ion concentration in the first core portion 1 in a completed EDF 10.

(D) Explanation of Modification of EDF

Figure 18:
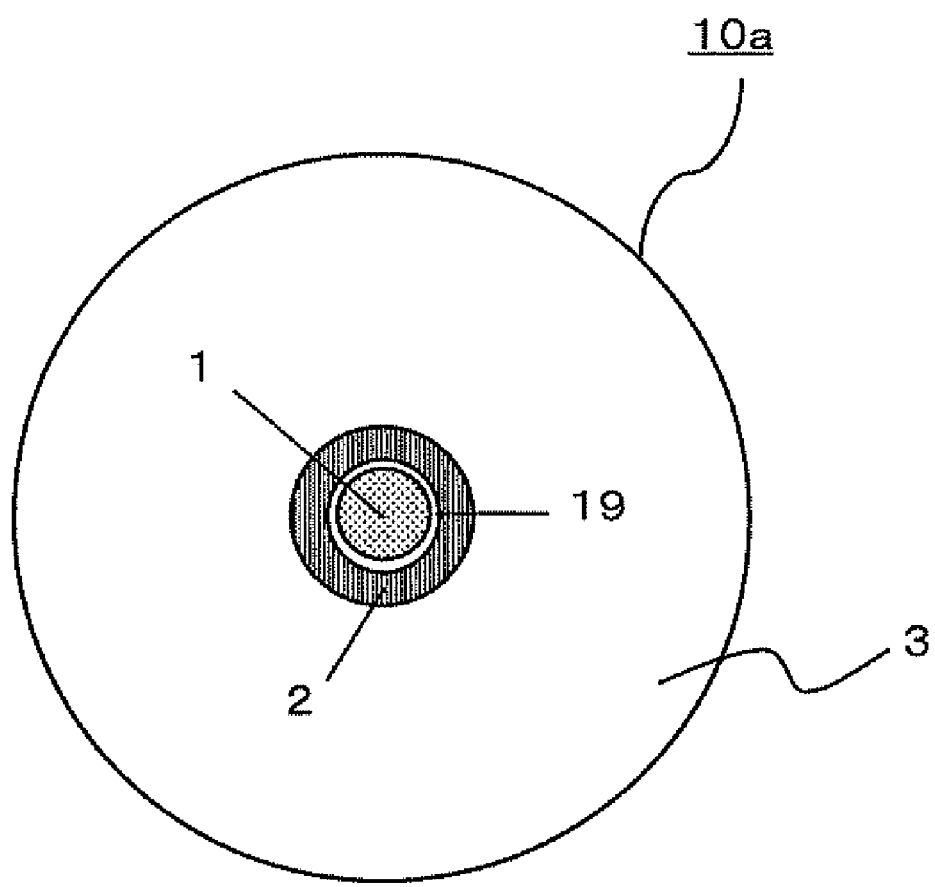
FIG. 18 is a diagram showing a modification of the EDF as shown in FIG. 1.

FIG. 18 is a view showing a modification of the EDF 10 shown in FIG. 1. As shown in FIG. 18, the EDF 10a of this modification is configured such that in addition to the EDF structure as shown in FIG. 1, a thin silicon dioxide layer 19 is provided between the first core portion 1 and the second core portion 2. Further, the silicon dioxide layer 19 is thin enough not to optically influence the signal light and the pump light (for example, ¼ of the wavelength of the signal light or thinner).

The silicon dioxide layer 19 is provided in order to prevent diffusion of the Erbium ions between the first core portion 1 and the second core portion 2. Accordingly, it is possible to increase the accuracy of the Erbium ion concentration in the core portions 1 and 2.

Figure 19:
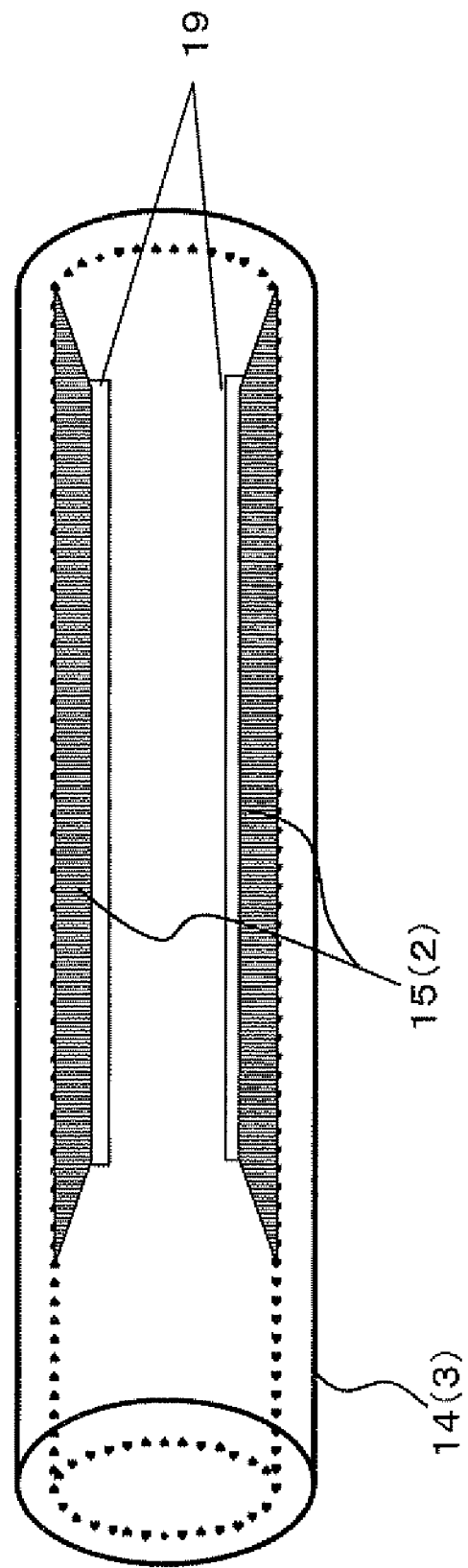
FIG. 19 is a diagram showing a manufacturing process of a silicon dioxide layer disposed between a first core portion and a second core portion of the EDF shown in FIG. 18.
Figure 20:
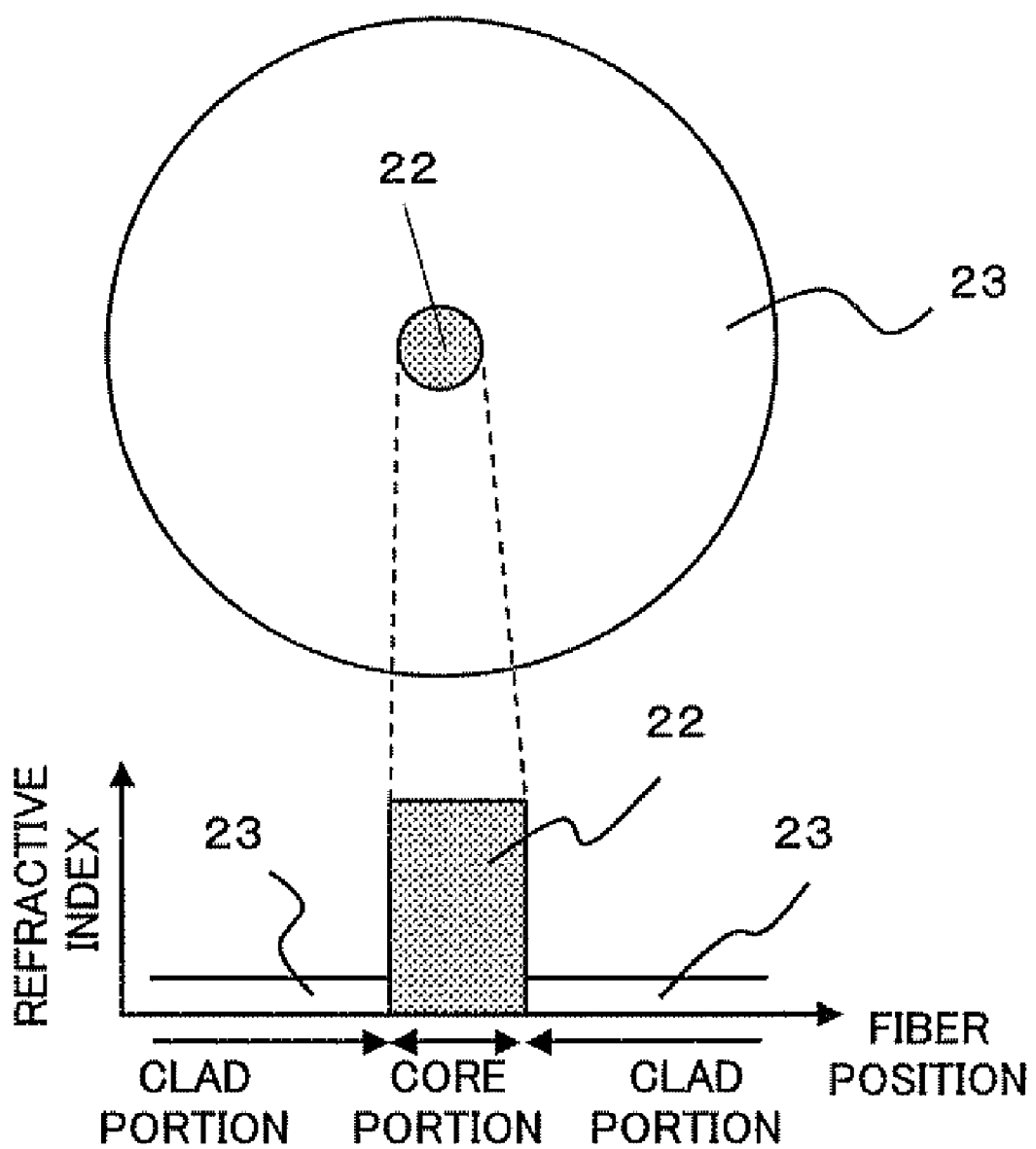
FIG. 20 is a diagram showing a cross-sectional structure of the conventional EDF provided with a single core portion and its refractive index distribution.

Moreover, as shown in FIG. 19, for example, the silicon dioxide layer 19 can be formed by depositing silicon dioxide inside the glass tube 14 to have the thickness as described above using the MCVD method after the second core portion 2 and the clad portion 3 are formed in the above described manufacturing method of the EDF 10.

It should be noted that the present invention is not limited to the above described embodiment, and can be implemented with various modifications within the scope of the present invention.

INDUSTRIAL APPLICABILITY

In a Wavelength Division Multiplex transmission system for expanding capacity, it is possible to suppress reduction in a gain due to the FWM, as well as to suppress reduction in a gain due to concentration quenching. Thus, a more efficient and economical optical transmission system can be implemented.

(E) Appendix (Appendix 1)

An optical amplifier comprising:

an optical fiber including: a first core portion doped with rare earth ions; a second core portion having a lower refractive index than that of the first core portion and provided along an outer circumference of the first core portion, the second core portion being doped with rare earth ions of a higher concentration than that of the first core portion; and a clad portion having a lower refractive index than that of the second core portion and provided along an outer circumference of the second core portion;

a forward pump unit that inputs first forward pump light in 980-nm band and second forward pump light in 1480-nm band to an input end of the optical fiber; and a backward pump unit that inputs backward pump light in 1480-nm band to an output end of the optical fiber, wherein population inversion ratios in the first and second core portions of the optical fiber are controlled by controlling an intensity ratio between the first forward pump light and the second forward pump light.

(Appendix 2)

The optical amplifier according to Appendix 1, wherein the intensity ratio is controlled so that the population inversion ratio in the second core portion is 0.6 or less.

(Appendix 3)

An optical fiber comprising:

a first core portion doped with rare earth ions;

a second core portion having a lower refractive index than that of the first core portion and provided along an outer circumference of the first core portion, the second core portion being doped with rare earth ions of a higher concentration than that of the first core portion; and a clad portion having a lower refractive index than that of the second core portion and provided along an outer circumference of the second core portion.

(Appendix 4)

The optical fiber according to Appendix 3, wherein the first core portion is provided at a region where the population inversion ratio tends to increase due to wavelength dependency of a beam profile when pump light in a plurality of wavelength bands propagate, and the second core portion is provided at a region where the population inversion ratio tends to be lower than that in the first core portion due to the wavelength dependency of the beam profile of the pump light.

(Appendix 5)

The optical fiber according to Appendix 4, wherein core diameters of the first core portion and the second core portion are respectively set such that, when pump light in a first wavelength band having a beam profile with a high confinement effect to the first core portion and pump light in a second wavelength band having a beam profile with a lower confinement effect to the first core portion than that of the pump light in the first wavelength band propagate as the pump light, contribution of the pump light in the second wavelength band to a change in the population inversion ratio in the second core portion becomes dominant.

(Appendix 6)

The optical fiber according to Appendix 5, wherein the core diameters of the first core portion and the second core portion are set to be a combination such that the contribution of the pump light in the second wavelength band to the change in the population inversion ratio in the second core portion becomes maximum within a range in which the pump light in the first wavelength propagates band in a single mode.

(Appendix 7)

The optical fiber according to one of Appendixes 4 to 6, wherein a concentration of the rare earth ions in the first core portion and a concentration of the rare earth ions in the second core portion are determined based on relation of degrees of changes in gain efficiency due to the pump light to the changes in the respective concentrations.

(Appendix 8)

The optical fiber according to Appendix 7, wherein the concentration of the rare earth ions in the second core portion in which the population inversion ratio tends to be lower is set to a value in a range in which the gain efficiency due to the pump light to the change in the concentration turns from an increase to a decrease.

(Appendix 9)

The optical fiber according to Appendix 7, wherein the concentration of the rare earth ions in the first core portion and the concentration of the rare earth ions in the second core portion are set to have increases in the concentration from a constant concentration, respectively, so that decrease in gain efficiency for the increase from the constant concentration is substantially even.

(Appendix 10)
The optical fiber according to Appendix 3, wherein
the rare earth ions to be added to the first core portion and the second core portion include at least Erbium ions.

(Appendix 11)
The optical fiber according to Appendix 10, wherein
one of the first core portion and the second core portion is further doped with at least one rare earth element selected from a group consisting of ytterbium, yttrium, lanthanum, and gadolinium.

(Appendix 12)
The optical fiber according to Appendix 5, wherein
the first wavelength band is 980-nm band, and the second wavelength band is 1480-nm band.

(Appendix 13)
An optical fiber comprising:
a core portion doped with rare earth ions; and
a clad portion, wherein
in the core portion, a concentration of the rare earth ions is set higher in a region where a population inversion ratio tends to decrease due to wavelength dependency of a beam profile when pump light of a plurality of wavelength bands propagates.

(Appendix 14)
The optical fiber according to Appendix 13, wherein
the concentration of the rare earth ions in the region in which the population inversion ratio tends to be lower is set to a value in a range in which the gain efficiency due to the pump light to the change in the concentration turns from an increase to a decrease.

(Appendix 15)
The optical fiber according to Appendix 4 or 12, wherein
the plurality of wavelength bands include at least a 980-nm band and a 1480-nm band.

(Appendix 16)
An optical amplifier comprising:
an amplifying medium configured by an optical fiber including: a first core portion doped with rare earth ions; a second core portion having a lower refractive index than that of the first core portion and provided along an outer circumference of the first core portion, the second core portion being doped with the rare earth ions of a higher concentration than that of the first core portion; and a clad portion having a lower refractive index than that of the second core portion and provided along an outer circumference of the second core portion; and
a pump light source for providing the amplifying medium with pump light including a wavelength with a higher confinement effect to the first core portion and a wavelength with a lower confinement effect to the first core portion.

(Appendix 17)
The optical amplifier according to Appendix 16, wherein
a difference between the wavelengths is 300 nm or more.

(Appendix 18)
The optical amplifier according to Appendix 16 or 17, wherein
the pump light source is configured to provide both of the light having the wavelengths as forward pump light.

(Appendix 19)
The optical amplifier according to Appendix 16 or 17, wherein
the pump light source is configured to provide the light having one of the wavelengths as forward pump light and the light having the other of the wavelengths as backward pump light.

(Appendix 20)
The optical amplifier according to one of Appendixes 16 to 19, wherein
the pump light source is configured to provide, as the pump light, at least 980-nm band light and 1480-nm band light.

(Appendix 21)
A manufacturing method of an optical fiber, comprising the steps of:
producing a first preform for a first core layer doped with rare earth ions using a rod shaped glass tube;
producing a second preform by forming a second core layer doped with the rare earth ions in an internal layer of a hollow glass tube to be a clad, the rare earth ions being of a higher concentration than a concentration of the rare earth ions added to the first preform; and
solidifying by inserting the first preform into the second preform.

(Appendix 22)
The manufacturing method of an optical fiber according to Appendix 21, wherein
the first preform is produced by forming a first glass porous body by depositing silicon dioxide onto the rod shaped glass tube, as well as by doping the first glass porous body with the rare earth ions, and
the second preform is produced by forming a second glass porous body by depositing silicon dioxide onto the internal layer of the hollow glass tube, as well as by doping the second glass porous body with the rare earth ions.

(Appendix 23)
The manufacturing method of an optical fiber according to Appendix 22, wherein
a proportion of pores in the second glass porous body is made larger than a proportion of pores in the first glass porous body.

(Appendix 24)
The manufacturing method of an optical fiber according to Appendix 22, wherein
when forming the second preform, a layer made of silicon dioxide is formed in a layer inner than the second core layer after forming the second core layer.

What is claimed is:
1. An optical amplifier comprising:
an optical fiber including: a first core portion doped with rare earth ions; a second core portion having a lower refractive index than that of the first core portion and provided along an outer circumference of the first core portion, the second core portion being doped with rare earth ions of a higher concentration than that of the first core portion; and a clad portion having a lower refractive index than that of the second core portion and provided along an outer circumference of the second core portion;
a forward pump unit that inputs first forward pump light in 980-nm band and second forward pump light in 1480-nm band to an input end of the optical fiber; and
a backward pump unit that inputs backward pump light in 1480-nm band to an output end of the optical fiber, wherein
population inversion ratios in the first and second core portions of the optical fiber are controlled by controlling an intensity ratio between the first forward pump light and the second forward pump light.

2. The optical amplifier according to claim 1, wherein the intensity ratio is controlled so that the population inversion ratio in the second core portion is 0.6 or less.

3. An optical amplifier method, comprising:
inputting first forward pump light in 980-nm band and second forward pump light in 1480-nm band to an input end of an optical fiber including a first core portion doped with rare earth ions, a second core portion having a lower refractive index than that of the first core portion and provided along an outer circumference of the first core portion, the second core portion being doped with rare earth ions of a higher concentration than that of the first core portion, and a clad portion having a lower refractive index than that of the second core portion and provided along an outer circumference of the second core portion;

inputting backward pump light in 1480-nm band to an output end of the optical fiber; and controlling population inversion ratios in the first and second core portions of the optical fiber, by controlling an intensity ratio between the first forward pump light and the second forward pump light.

4. The optical amplifier method according to claim 3, wherein the intensity ratio is controlled so that the population inversion ratio in the second core portion is 0.6 or less.

* * * * *